(12) United States Patent
Namiki

(10) Patent No.: US 12,058,293 B2
(45) Date of Patent: Aug. 6, 2024

(54) IMAGE READING APPARATUS

(71) Applicant: SEIKO EPSON CORPORATION, Tokyo (JP)

(72) Inventor: Masaki Namiki, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/468,919

(22) Filed: Sep. 18, 2023

(65) Prior Publication Data
US 2024/0098197 A1    Mar. 21, 2024

(30) Foreign Application Priority Data

Sep. 20, 2022   (JP) .................................. 2022-148802

(51) Int. Cl.
*H04N 1/04*   (2006.01)
*H04N 1/00*   (2006.01)

(52) U.S. Cl.
CPC ..... *H04N 1/00615* (2013.01); *H04N 1/00596* (2013.01)

(58) Field of Classification Search
None
See application file for complete search history.

(56) References Cited

U.S. PATENT DOCUMENTS

| | | | |
|---|---|---|---|
| 9,894,235 B2* | 2/2018 | Yue | B65H 15/004 |
| 2015/0210093 A1* | 7/2015 | Ogawa | B41J 11/0025 |
| | | | 347/104 |
| 2018/0041651 A1* | 2/2018 | Nakamura | H04N 1/00588 |
| 2018/0176398 A1* | 6/2018 | Harada | B65H 29/70 |
| 2020/0288029 A1* | 9/2020 | Kawata | H04N 1/00702 |
| 2020/0344376 A1* | 10/2020 | Sasaki | B41J 29/02 |
| 2021/0029263 A1* | 1/2021 | Masaru | H04N 1/00607 |
| 2021/0198058 A1* | 7/2021 | Nakashima | B65H 3/54 |
| 2021/0243316 A1* | 8/2021 | Tezuka | H04N 1/00525 |
| 2024/0015253 A1* | 1/2024 | Noda | H04N 1/00525 |

FOREIGN PATENT DOCUMENTS

JP    2012246099 A    12/2012

* cited by examiner

*Primary Examiner* — Dung D Tran
(74) *Attorney, Agent, or Firm* — Pramod Chintalapoodi

(57) ABSTRACT

An image reading apparatus includes a guide member that guides a medium by bringing the medium into contact with a contact surface of a medium placement portion is displaceable between a first position at which the contact surface forms a first inclination angle with respect to a placement surface when viewed in a width direction and a second position at which the contact surface forms a second inclination angle with respect to the placement surface when viewed in the width direction, the guide member moves from a first position to a second position as the medium placement portion moves from an opening position to an accommodation position, and moves from the second position to the first position as the medium placement portion moves from the accommodation position to the opening position.

14 Claims, 19 Drawing Sheets

IMAGE READING APPARATUS

The present application is based on, and claims priority from JP Application Serial Number 2022-148802, filed Sep. 20, 2022, the disclosure of which is hereby incorporated by reference herein in its entirety.

BACKGROUND

1. Technical Field

The present disclosure relates to an image reading apparatus.

2. Related Art

Various image reading apparatuses have been used in the related art. Among them, there is an image reading apparatus including a medium placement portion on which a medium inserted from an insertion port is placed, a feeding unit that feeds the medium, and a reading unit that reads an image of the medium. For example, JP-A-2012-246099 discloses a scanner including a tray on which a sheet inserted from an insertion port is placed, a transport roller that feeds the sheet, and an information reading unit that reads an image of the sheet.

However, in an image reading apparatus of the related art which includes a medium placement portion, a feeding unit, and a reading unit, such as the scanner disclosed in JP-A-2012-246099, setting properties at the time of inserting a medium from an insertion port may not be satisfactory due to an excessively large space extending from the insertion port into the apparatus.

SUMMARY

An image reading apparatus of the present disclosure for solving the above-described problem includes an insertion port for a medium, a medium placement portion that is displaceable between an opening position at which the insertion port is open and an accommodation position at which the insertion port is closed by at least a portion of the medium placement portion being accommodated in the insertion port, the medium placement portion being configured such that the medium inserted from the insertion port is placed on a placement surface when the medium placement portion is located at the opening position, a feeding unit that feeds the medium placed on the placement surface in a feeding direction, a reading unit that reads an image of the medium fed by the feeding unit, and a guide member that is provided at a position facing the placement surface and guides the medium by bringing the medium into contact with a contact surface, in which the guide member is displaceable between a first position and a second position, the first position being a position where the contact surface forms a first inclination angle with respect to the placement surface so as to form an acute angle that narrows in the feeding direction when viewed in a width direction intersecting the feeding direction, the second position being a position where the contact surface forms a second inclination angle with respect to the placement surface, and the second inclination angle being larger than the first inclination angle when viewed in the width direction, and the guide member moves from the first position to the second position as the medium placement portion moves from the opening position to the accommodation position, and moves from the second position to the first position as the medium placement portion moves from the accommodation position to the opening position.

DESCRIPTION OF EMBODIMENTS

Figure 1:
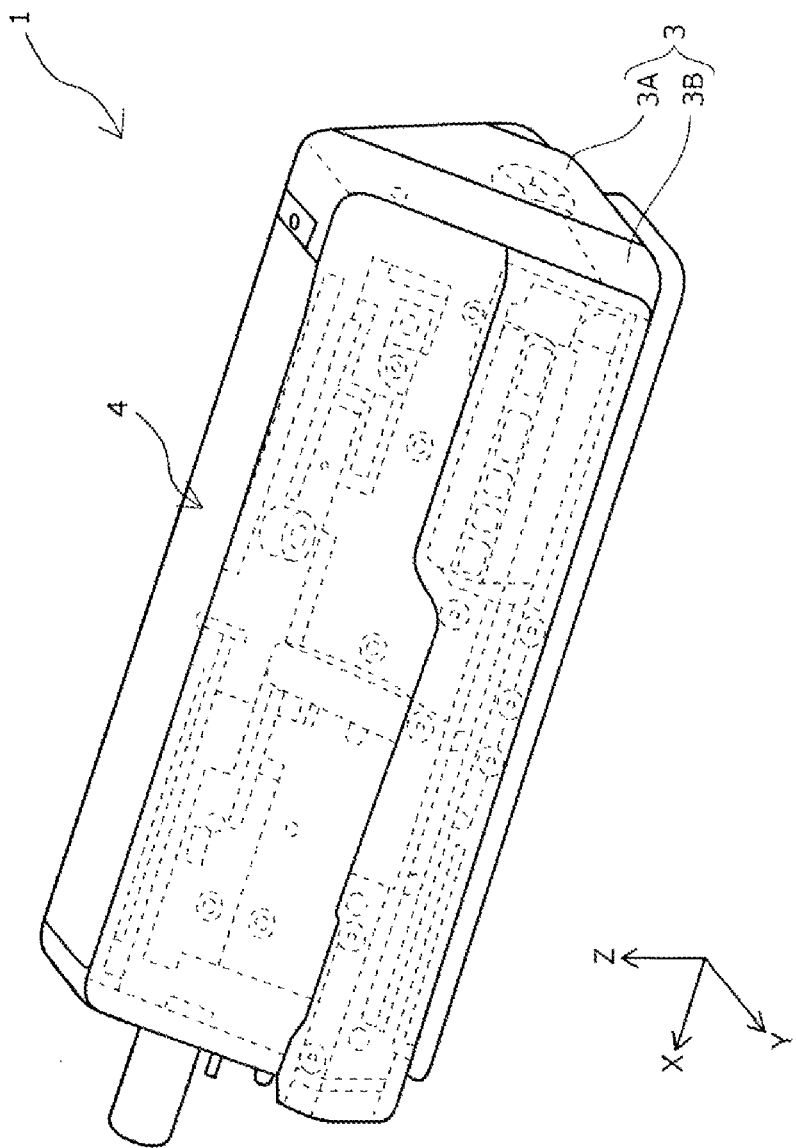
FIG. 1 is a perspective view illustrating the appearance of an image reading apparatus according to Example 1 of the present disclosure and illustrating a state where a medium placement portion is located at an accommodation position.

Hereinafter, the present disclosure will be schematically described.

According to a first aspect of the present disclosure, there is provided an image reading apparatus including an insertion port for a medium, a medium placement portion that is displaceable between an opening position at which the insertion port is open and an accommodation position at which the insertion port is closed by at least a portion of the medium placement portion being accommodated in the insertion port, the medium placement portion being configured such that the medium inserted from the insertion port is placed on a placement surface when the medium placement portion is located at the opening position, a feeding unit that feeds the medium placed on the placement surface in a feeding direction, a reading unit that reads an image of the medium fed by the feeding unit, and a guide member that is provided at a position facing the placement surface and guides the medium by bringing the medium into contact with a contact surface, in which the guide member is displaceable between a first position and a second position, the first position being a position where the contact surface forms a first inclination angle with respect to the placement surface so as to form an acute angle that narrows in the feeding direction when viewed in a width direction intersecting the feeding direction, the second position being a position where the contact surface forms a second inclination angle with respect to the placement surface, and the second inclination angle being larger than the first inclination angle when viewed in the width direction, and the guide member moves from the first position to the second position as the medium placement portion moves from the opening position to the accommodation position, and moves from the second position to the first position as the medium placement portion moves from the accommodation position to the opening position.

According to this aspect, the guide member that is provided at the position facing the placement surface and guides the medium by bringing the medium into contact with the contact surface is provided. For this reason, it is possible to improve a setting property at the time of inserting the medium from the insertion port. Further, the guide member is displaceable between the first position and the second position, the first position being a position where the contact surface forms the first inclination angle with respect to the placement surface so as to form an acute angle that narrows in the feeding direction when viewed in the width direction, the second position being a position where the contact surface forms the second inclination angle with respect to the placement surface, and the second inclination angle being larger than the first inclination angle when viewed in the width direction. The guide member moves from the first position to the second position as the medium placement portion moves from the opening position to the accommodation position, and moves from the second position to the first position as the medium placement portion moves from the accommodation position to the opening position. That is, the guide member is disposed at the first position at which it is possible to improve a setting property at the time of inserting the medium from the insertion port in association with the movement of the medium placement portion from the accommodation position to the opening position at the time of setting the medium. In this manner, the guide member is displaced in association with the displacement of the medium placement portion, and thus it is possible to reduce a user's burden and to particularly improve a setting property of the medium.

Further, in a second aspect of the present disclosure according to the image reading apparatus of the first aspect, at least a portion of the contact surface of the guide member is located upstream of the feeding unit in the feeding direction at the first position and is located downstream of the medium placement portion in the feeding direction at the second position, and at least a portion of the guide member located at the first position overlaps at least a portion of the medium placement portion assumed to be located at the accommodation position when viewed in the width direction.

According to this aspect, at least a portion of the guide member located at the first position overlaps at least a portion of the medium placement portion assumed to be located at the accommodation position when viewed in the width direction. For this reason, it is possible to bring the guide member and the medium placement portion close to each other and to suppress increase in the size of the apparatus.

Further, in a third aspect of the present disclosure according to the image reading apparatus of the first or second aspect, the image reading apparatus further includes a main body portion that is provided with a rotation shaft, in which the guide member is displaceable between the first position and the second position by being rotated about the rotation shaft, and the image reading apparatus further includes an elastic member that applies a force to the guide member.

According to this aspect, the guide member can be displaced between the first position and the second position by rotating about the rotation shaft. By adopting a configuration in which the guide member is displaced by being rotated in this manner, it is possible to effectively utilize a space inside the apparatus in a direction intersecting the rotation shaft and to effectively suppress an increase in the size of the apparatus.

Further, in a fourth aspect of the present disclosure according to the image reading apparatus of the third aspect, the guide member moves from the second position to the first position when the elastic member applies a force to the guide member so that the guide member moves from the second position to the first position as the medium placement portion moves from the accommodation position to the opening position.

According to this aspect, the guide member moves from the second position to the first position when the elastic member applies a force to the guide member so that the guide member moves from the second position to the first position as the medium placement portion moves from the accommodation position to the opening position. Since the guide member is moved by the elastic member applying a force to the guide member in association with the movement of the medium placement portion, it is possible to suitably move the guide member by the elastic member in association with the movement of the medium placement portion.

Further, in a fifth aspect of the present disclosure according to the image reading apparatus of the third aspect, the guide member includes a rail portion extending in an extension direction along the contact surface, and is movable along the rail portion with respect to the main body portion by the rail portion engaging with the rotation shaft, and the guide member engages with the rotation shaft at one end of the rail portion in the extension direction when the guide member is located at the first position, and engages with the rotation shaft at the other end of the rail portion in the extension direction when the guide member is located at the second position.

According to this aspect, the guide member includes the rail portion extending in an extension direction along the contact surface, and is movable along the rail portion with respect to the main body portion by the rail portion engaging with the rotation shaft, and the guide member engages with the rotation shaft at one end of the rail portion in the extension direction when the guide member is located at the first position, and engages with the rotation shaft at the other end of the rail portion in the extension direction when the guide member is located at the second position. With such a configuration, it is possible to greatly move the guide member in association with the movement of the medium placement portion and to effectively suppress an increase in the size of the apparatus. In addition, since the contact surface can be made wide, a setting property of the medium can be particularly improved.

Further, in a sixth aspect of the present disclosure according to the image reading apparatus of any one of the first to fifth aspects, the guide member moves from the first position to the second position when an abutting portion provided in the medium placement portion comes into contact with an abutted portion provided in the guide member as the medium placement portion moves from the opening position to the accommodation position.

According to this aspect, the guide member moves from the first position to the second position when the abutting portion provided in the medium placement portion comes into contact with the abutted portion provided in the guide member as the medium placement portion moves from the opening position to the accommodation position. With such a configuration, it is possible to easily form a configuration in which the movement of the guide member is associated with the movement of the medium placement portion.

Further, in a seventh aspect of the present disclosure according to the image reading apparatus of the first or second aspect, the image reading apparatus further includes an opening/closing member that is openable when the feeding unit is attached and detached, in which the guide member is attached to the opening/closing member so that the contact surface is located upstream of the opening/closing member in the feeding direction when the guide member is located at the first position.

According to this aspect, the image reading apparatus further includes the opening/closing member that is openable when the feeding unit is attached and detached, and the guide member is attached to the opening/closing member so that the contact surface is located upstream of the opening/closing member in the feeding direction when the guide member is located at the first position. For this reason, the guide member can guide the medium upstream of the opening/closing member in the feeding direction, and it is possible to prevent the accuracy of guidance of the guide member from being lowered due to the opening/closing member.

Further, in an eighth aspect of the present disclosure according to the image reading apparatus of the seventh aspect, the guide member is disposed at a position between the medium placement portion and the opening/closing member in the feeding direction when the guide member is located at the second position.

According to this aspect, the guide member is disposed at a position between the medium placement portion and the opening/closing member in the feeding direction when the guide member is located at the second position. For this reason, it is possible to dispose the guide member using a space between the medium placement portion and the opening/closing member and to effectively suppress an increase in the size of the apparatus.

Further, in a ninth aspect of the present disclosure according to the image reading apparatus of the seventh aspect, the image reading apparatus further includes a main body portion that includes a first unit and a second unit provided with the opening/closing member and openable and closable with respect to the first unit, in which the guide member includes a handhold portion, and the opening/closing member is opened with respect to the second unit when a force is applied to the handhold portion in a direction opposite to a direction in which the second unit is opened with respect to the first unit, with respect to the second unit opened for the first unit.

According to this aspect, the guide member includes the handhold portion, and the opening/closing member is opened with respect to the second unit when a force is applied to the handhold portion in a direction opposite to a direction in which the second unit is opened with respect to the first unit, with respect to the second unit opened for the first unit. With such a configuration, the user can easily open the opening/closing member by holding the handhold portion with his or her hand, and it is possible to reduce the user's burden at the time of attaching and detaching the feeding unit.

Further, in a tenth aspect of the present disclosure according to the image reading apparatus of the seventh aspect, the image reading apparatus further includes an elastic member that applies a force to the guide member, in which a first elastic member and a second elastic member are provided as the elastic member, the first elastic member is attached to a first attachment portion provided in the opening/closing member and a second attachment portion provided in the guide member, the second elastic member is attached to a third attachment portion provided in the opening/closing member and a fourth attachment portion provided in the guide member, and at least a portion of the feeding unit is disposed at a position between the first elastic member and the second elastic member in the width direction.

According to this aspect, the first elastic member and the second elastic member are provided as the elastic member, the first elastic member is attached to the first attachment portion provided in the opening/closing member and the second attachment portion provided in the guide member, the second elastic member is attached to the third attachment portion provided in the opening/closing member and the fourth attachment portion provided in the guide member, and at least a portion of the feeding unit is disposed at a position between the first elastic member and the second elastic member in the width direction. With such a configuration, it is possible to dispose the elastic members on both sides of the feeding unit in the width direction and to improve a balance of forces applied to the opening/closing member and the guide member via the elastic members.

Further, in an eleventh aspect of the disclosure according to the image reading apparatus of any one of the first to tenth aspects, a feeding roller and a separation portion are provided as the feeding unit, the separation portion being provided at a position facing the feeding roller and being configured to separate one medium by nipping the medium together with the feeding roller when a plurality of the media are placed on the medium placement portion, and the guide member is located upstream of a nip position between the feeding roller and the separation portion in the feeding direction.

According to this aspect, the feeding roller and the separation portion are provided as the feeding unit, and the guide member is located upstream of the nip position between the feeding roller and the separation portion in the feeding direction. With such a configuration, the guide member can suitably guide the medium to the nip position, and it is possible to particularly improve a setting property of the medium.

Further, in a twelfth aspect of the present disclosure according to the image reading apparatus of the eleventh aspect, the guide member includes a first arm portion and a second arm portion respectively having the contact surfaces, and the feeding roller is disposed at a position between the first arm portion and the second arm portion in the width direction.

According to this aspect, the feeding roller is disposed at a position between the first arm portion and the second arm portion in the width direction. With such a configuration, it is possible to secure a wide contact surface of the first arm portion and the second arm portion without increasing the size of the apparatus and to particularly improve a setting property of the medium.

Further, in a thirteenth aspect of the present disclosure according to the image reading apparatus of the eleventh aspect, the medium placement portion overlaps at least a portion of the feeding roller and at least a portion of the separation section in a vertical direction when viewed in the width direction when the medium placement portion is located at the accommodation position.

According to this aspect, the medium placement portion overlaps at least a portion of the feeding roller and at least a portion of the separation section in a vertical direction when viewed in the width direction when the medium placement portion is located at the accommodation position. For this reason, it is possible to bring the medium placement portion, the feeding roller, and the separation portion close to each other and to suppress an increase in the size of the apparatus.

Further, in a fourteenth aspect of the present disclosure according to the image reading apparatus of any one of the first to thirteenth aspects, the medium placement portion includes a placement assisting portion configured to be accommodated and extended in a state where the medium placement portion is located at the opening position.

According to this aspect, the medium placement portion includes the placement assisting portion capable of being accommodated and extended in a state where the medium placement portion is located at the opening position. For this reason, it is possible to use a large-sized medium while suppressing an increase in the size of the apparatus.

Hereinafter, the present disclosure will be specifically described.

Hereinafter, as an example of an image reading apparatus, a scanner 1 capable of reading at least one surface of a first surface and a second surface opposite to the first surface of a document will be described. The scanner 1 is a so-called sheet-feed type scanner that reads an image of a document while moving the document, which is an example of a medium, with respect to a reading unit 2 to be described below. In this specification, the document includes not only a sheet-like document but also a card-like document and a booklet-like document.

Note that, in an XYZ coordinate system illustrated in each of drawings, an X-axis direction is a width direction. A Y-axis direction is a front-back direction, and a Z-axis direction is a direction along a vertical direction. In this embodiment, a +Y direction is a direction from a rear surface to a front surface of the apparatus, and a −Y direction is a direction from the front surface to the rear surface of the apparatus. In addition, a left direction when seen from the front surface of the apparatus is a +X direction, and a right direction is a −X direction. Further, hereinafter, a direction in which the document is transported may be referred to as "downstream", and a direction opposite thereto may be referred to as "upstream".

Example 1

First, a scanner 1 in Example 1 will be described with reference to FIGS. 1 to 16. The scanner 1 in this example includes a medium feeding device. In this example, the medium feeding device has a configuration in which a reading unit 2 is removed from the scanner 1. However, from the viewpoint of feeding a document in the scanner 1, the entire scanner 1 including the reading unit 2 may be the medium feeding device.

Figure 11:
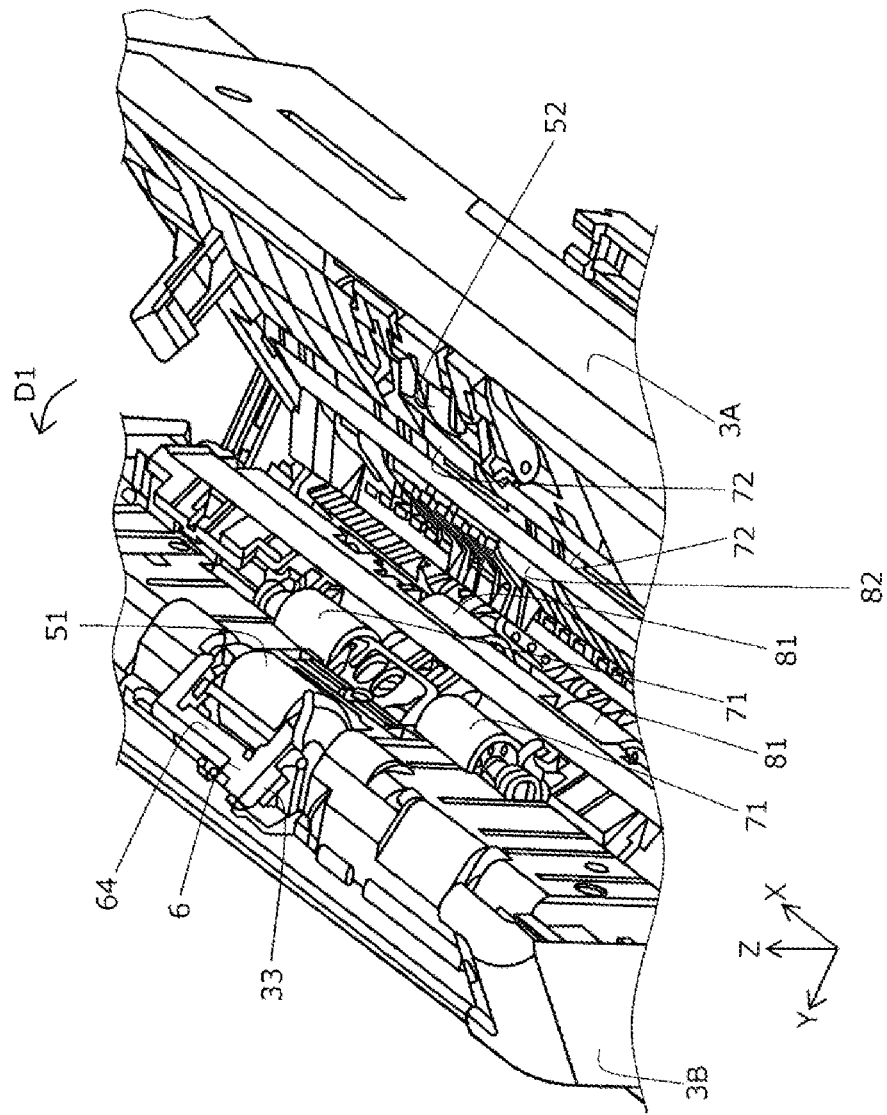
FIG. 11 is a perspective view illustrating the medium placement portion of the image reading apparatus in FIG. 1 and illustrating a state where a second unit is open with respect to a first unit.
Figure 12:
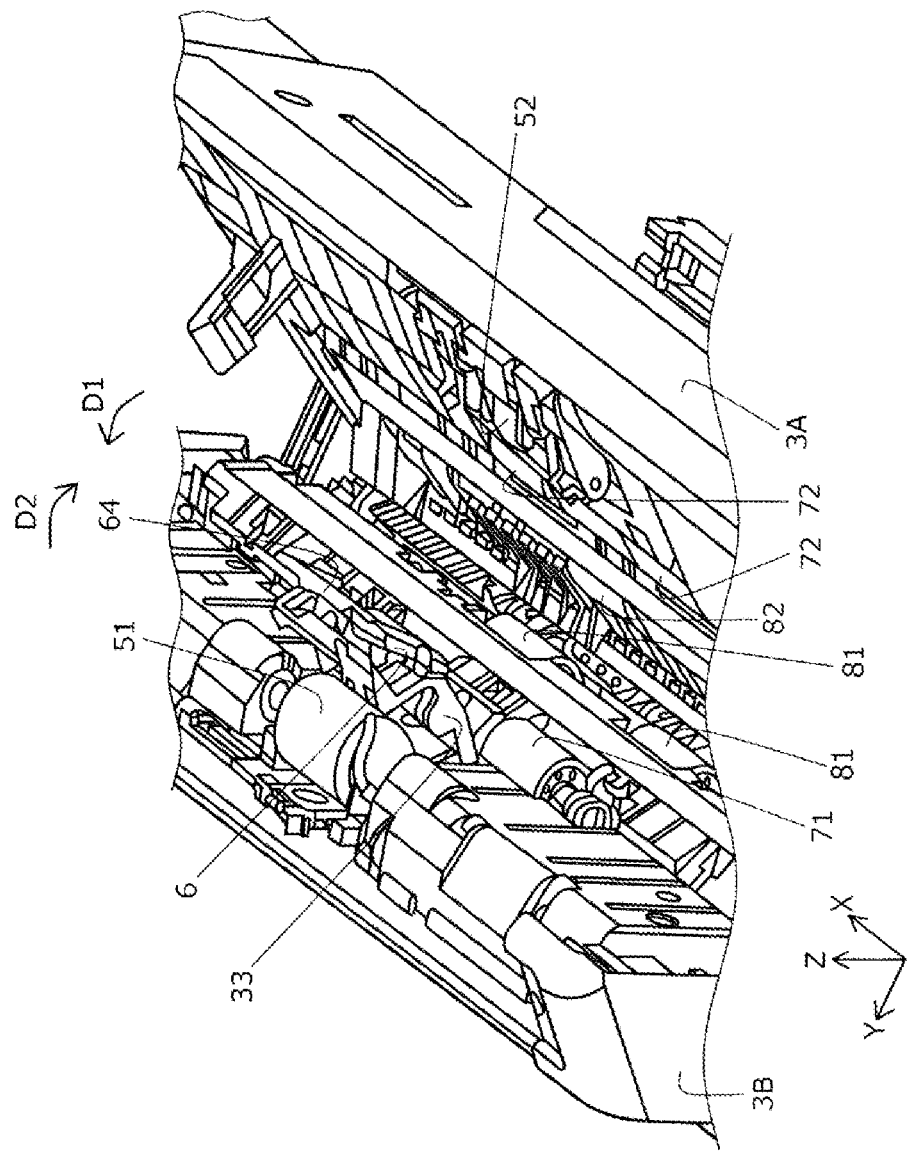
FIG. 12 is a view illustrating a state where an opening/closing member is opened with respect to the second unit from the state illustrated in FIG. 11.

As illustrated in FIGS. 1, 2, 5, 6, and the like, the scanner 1 according to this example includes a main body portion 3. The main body portion 3 includes a first unit 3A and a second unit 3B. Note that the second unit 3B can be opened and closed by being rotated with respect to the first unit 3A about a rotation shaft which is not illustrated in the drawing. FIGS. 1, 2, 5 and 6 illustrate a state where the second unit 3B is closed with respect to the first unit 3A, and FIGS. 11 and 12 illustrate a state where the second unit 3B is opened with respect to the first unit 3A. Normally, the second unit 3B is closed with respect to the first unit 3A, but the second unit 3B is opened with respect to the first unit 3A at the time of maintenance or the like.

Figure 2:
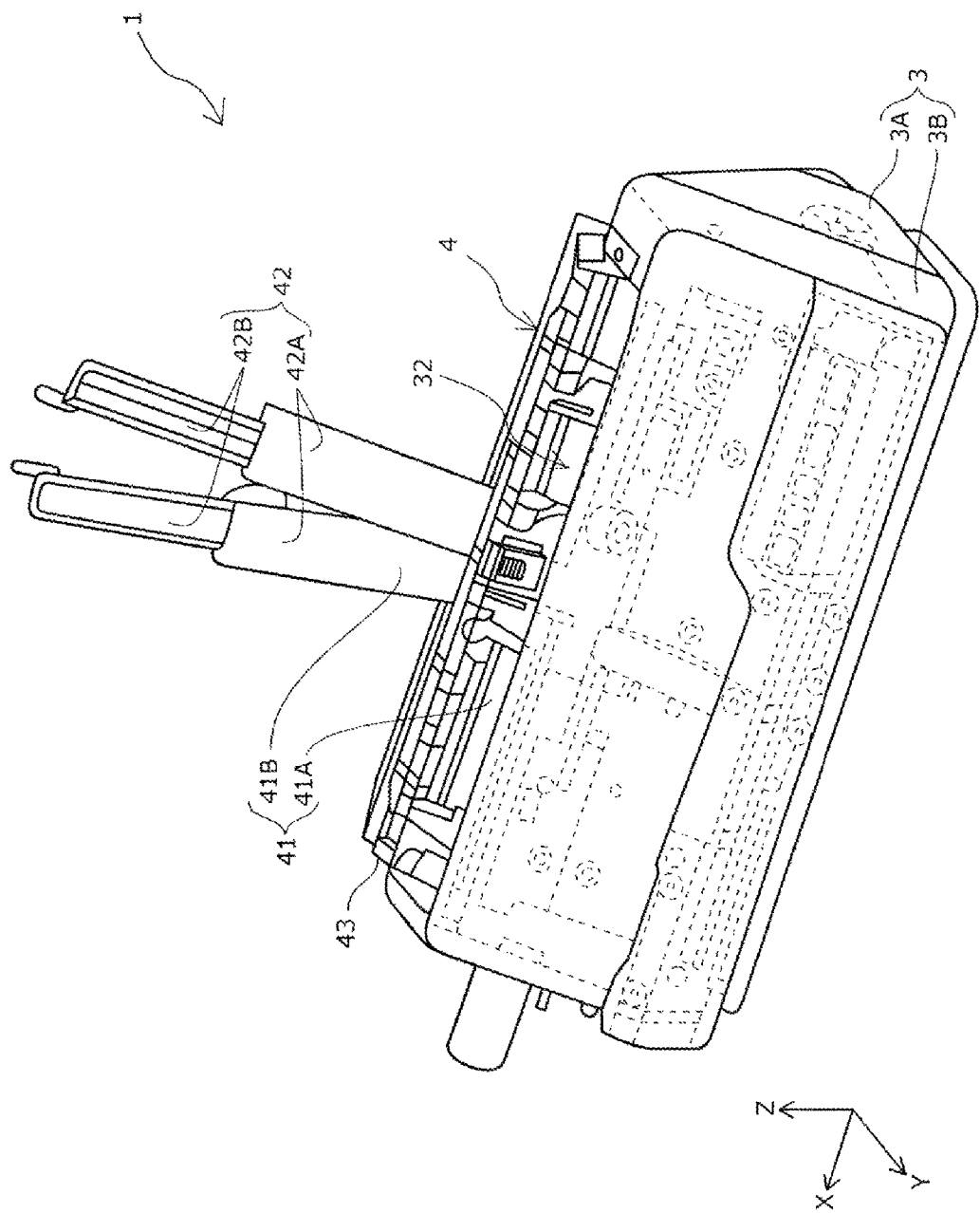
FIG. 2 is a perspective view illustrating the appearance of the image reading apparatus in FIG. 1 and illustrating a state where the medium placement portion is located at an opening position.
Figure 5:
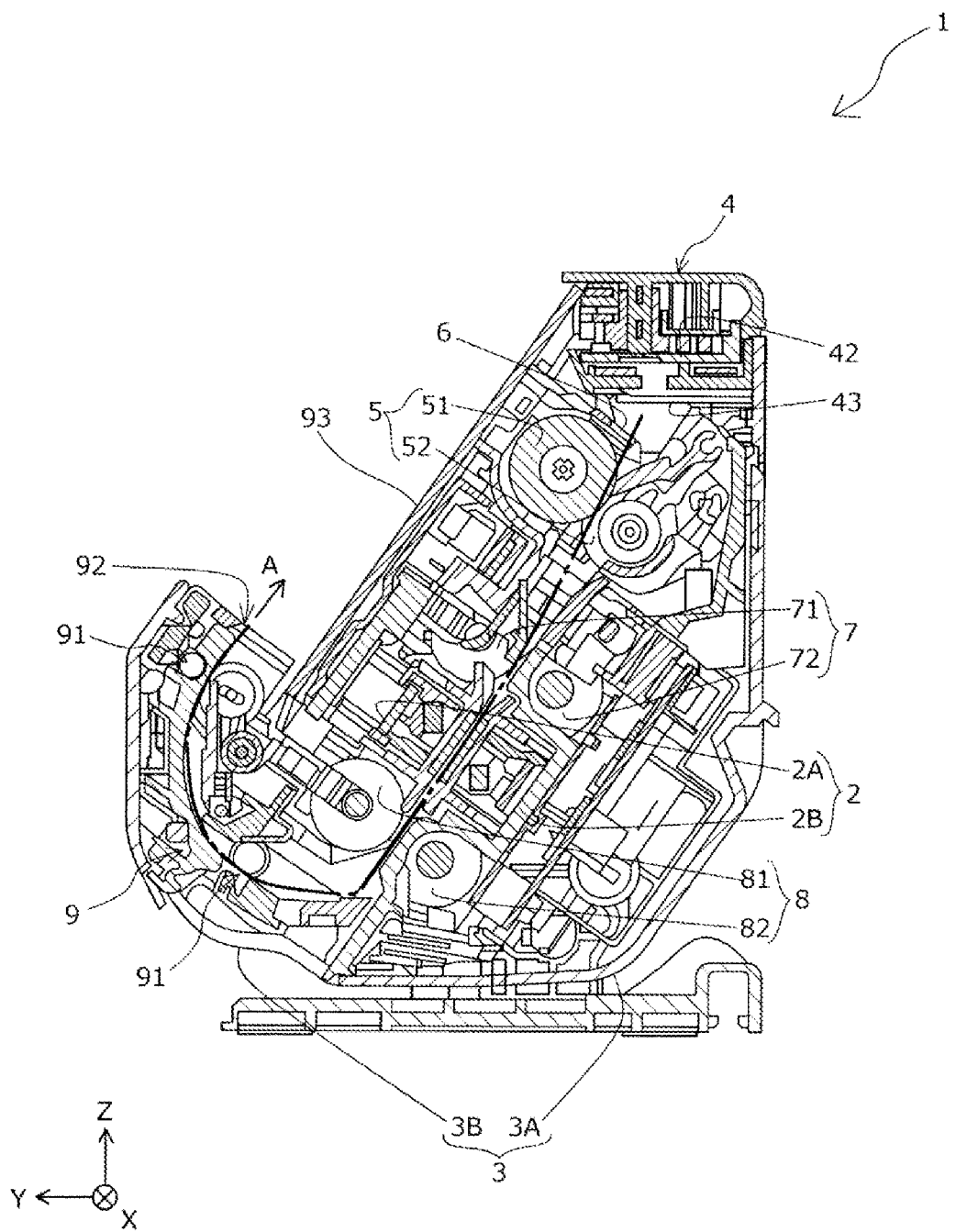
FIG. 5 is a side cross-sectional view illustrating an internal configuration of the image reading apparatus in FIG. 1 and illustrating a state where the medium placement portion is located at an accommodation position.
Figure 6:
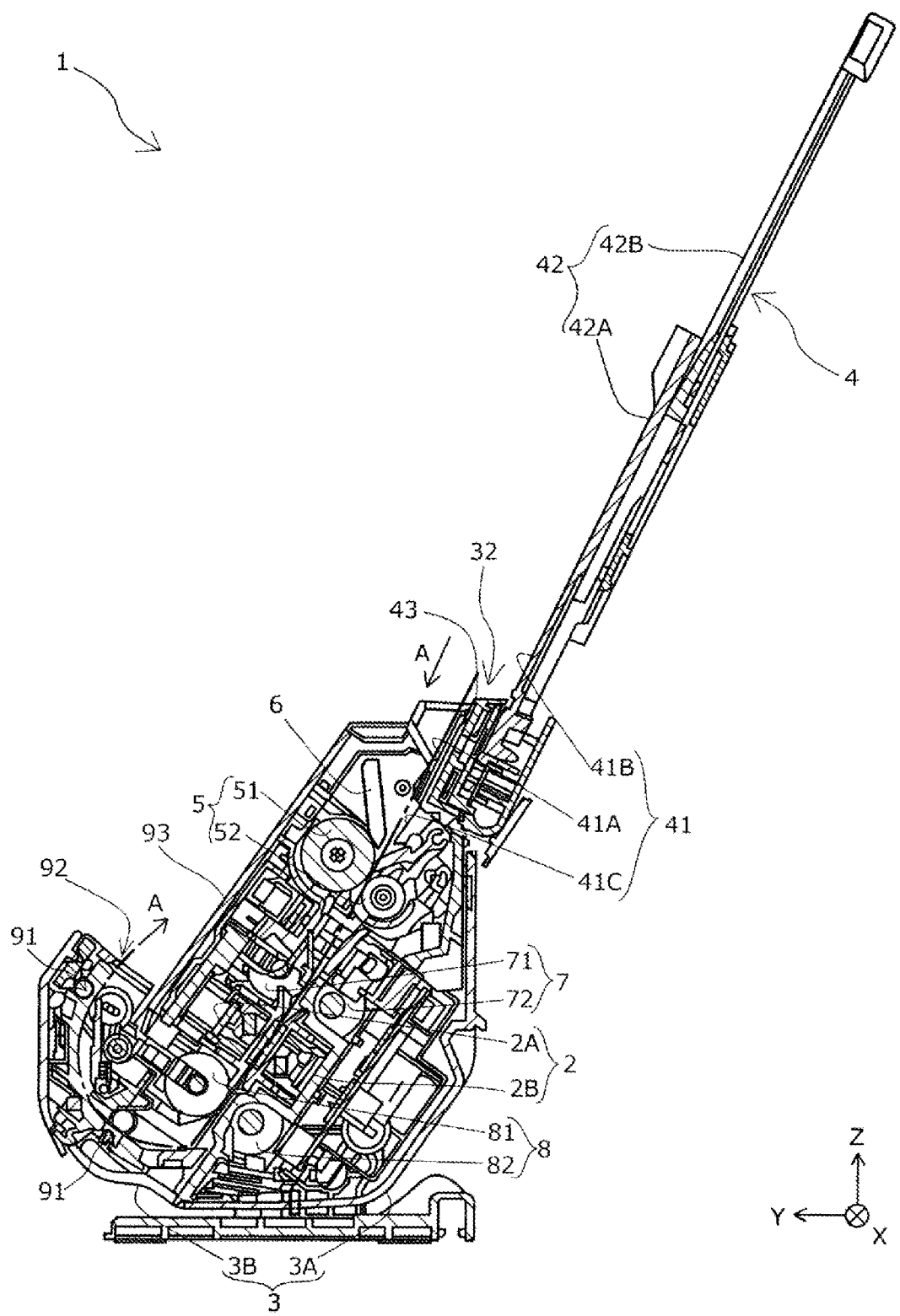
FIG. 6 is a side cross-sectional view illustrating an internal configuration of the image reading apparatus in FIG. 1 and illustrating a state where the medium placement portion is located at an opening position.

As illustrated in FIGS. 1, 2 and the like, in the scanner 1 of this example, a medium placement portion 4 is attached to the main body portion 3. As illustrated in FIGS. 2, 6, and the like, the main body portion 3 is provided with an insertion portion 32 for a document, and the medium placement portion 4 can be displaced between an opening position where the insertion portion 32 provided in the main body portion 3 is opened as illustrated in FIGS. 2, 6, and the like and an accommodation position where at least a portion of the medium placement portion 4 is accommodated in the insertion portion to close the insertion portion 32 as illustrated in FIGS. 1, 5, and the like. The medium placement portion 4 is configured such that the medium inserted from the insertion port 32 is placed on a placement surface 41 when the medium placement portion 4 is located at the opening position.

Figure 3:
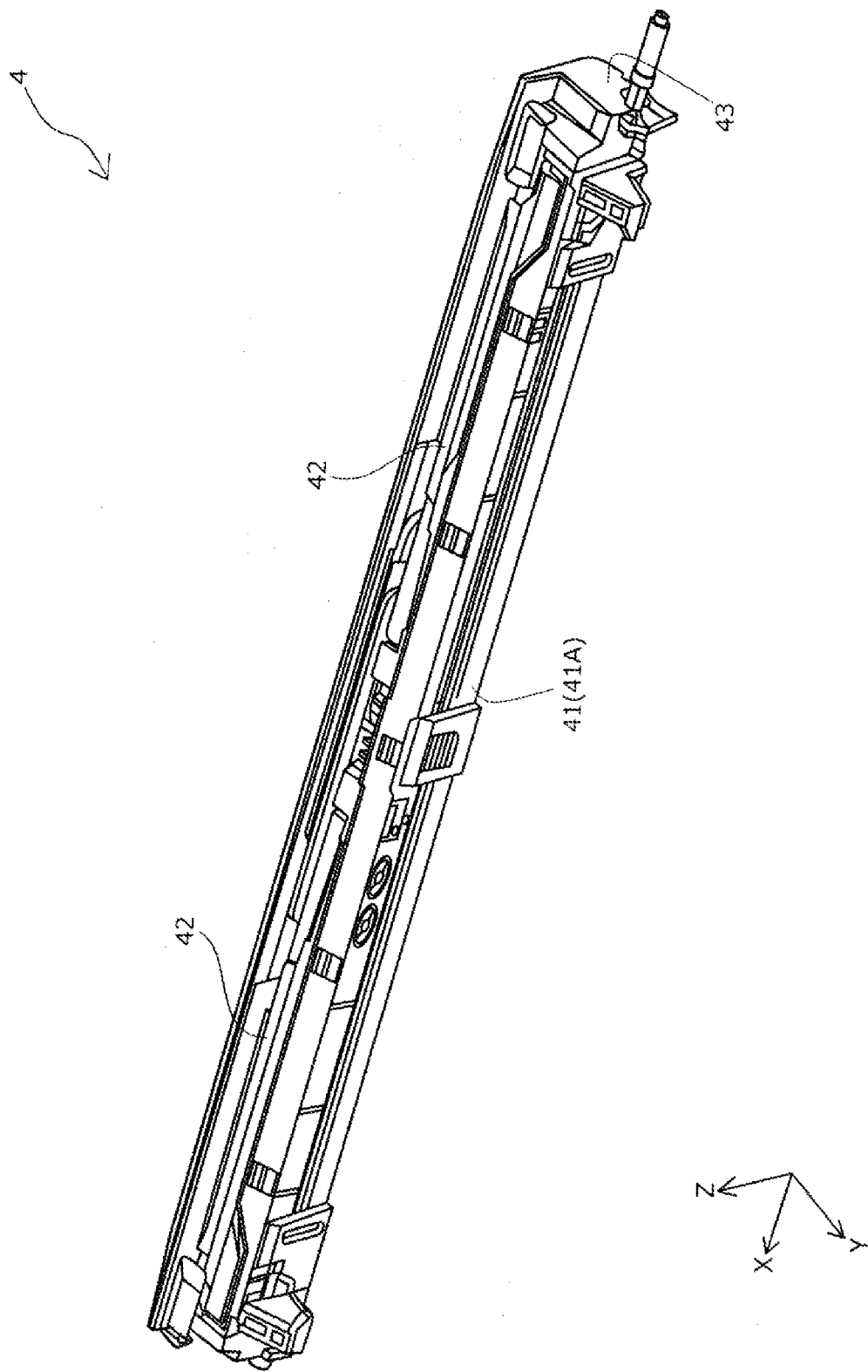
FIG. 3 is a perspective view illustrating the medium placement portion of the image reading apparatus in FIG. 1 and illustrating a state where a placement assisting portion is stored.
Figure 4:
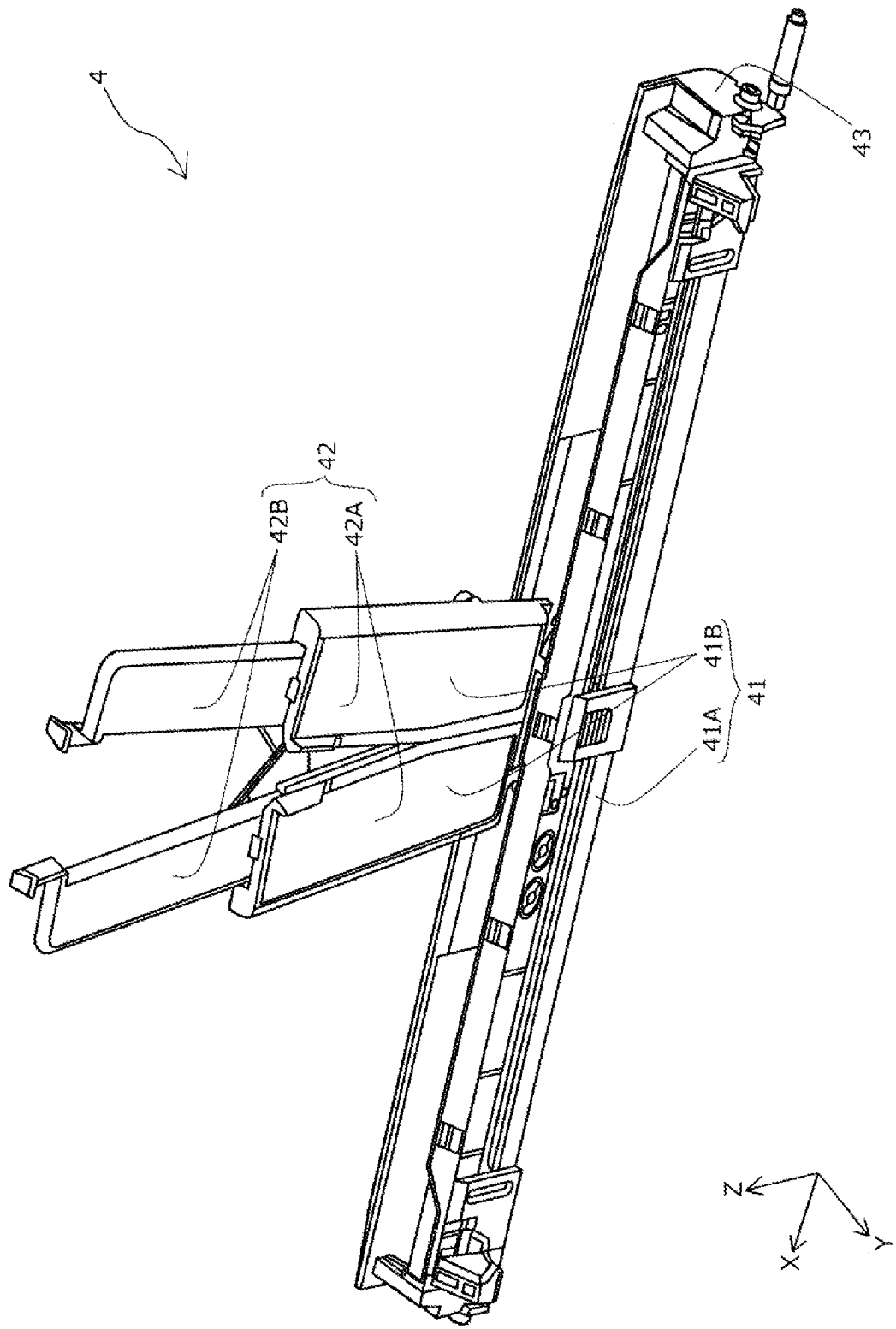
FIG. 4 is a perspective view illustrating a medium placement portion of the image reading apparatus of FIG. 1, illustrating a state where a placement assisting portion has extended.

As illustrated in FIGS. 2, 4, 6, and the like, the medium placement portion 4 includes a placement assisting portion 42. Here, the placement assisting portion 42 is configured to be capable of being accommodated and extended in a state where the medium placement portion 4 is located at the opening position. FIG. 3 and FIG. 5 illustrate a state where the placement assisting portion 42 is accommodated in an accommodation portion 43, and FIGS. 2, 4 and 6 illustrate a state where the placement assisting portion 42 is exposed from the accommodation portion 43 and an extension portion 42A extends from a base portion 42B. Even when the extension portion 42A does not extend from the base portion 42B, a small-sized document can be stably placed on the medium placement portion 4. However, when a large-sized document is used, the document can be stably placed on the medium placement portion 4 by extending the extension portion 42B from the base portion 42A. Note that both a surface 41A of the accommodation portion 43 and a surface 41B of the placement assisting portion 42 are provided as the placement surface 41 of the medium placement portion 4.

When the medium placement portion 4 is located at the accommodation position, the entire size of the scanner 1 can be reduced, and foreign matter can be prevented from entering the medium placement portion 4 from the insertion port 32. In addition, when the medium placement portion 4 is located at the opening position, a medium inserted from the insertion port 32 can be placed on the placement surface 41, and the reading of an image of a document can be started. As illustrated in FIGS. 5, 6, and the like, a feeding roller 51 is provided inside the scanner 1 as a feeding unit 5 that feeds the document placed on the placement surface 41 in a feeding direction A. In addition, a separation roller 52 is provided at a position facing the feeding roller 51. The separation roller 52 constitutes the feeding unit 5 together with the feeding roller 51 and serves as a separation portion that can separate one document by nipping the document together with the feeding roller 51 when a plurality of documents are placed on the medium placement portion 4.

Figure 7:
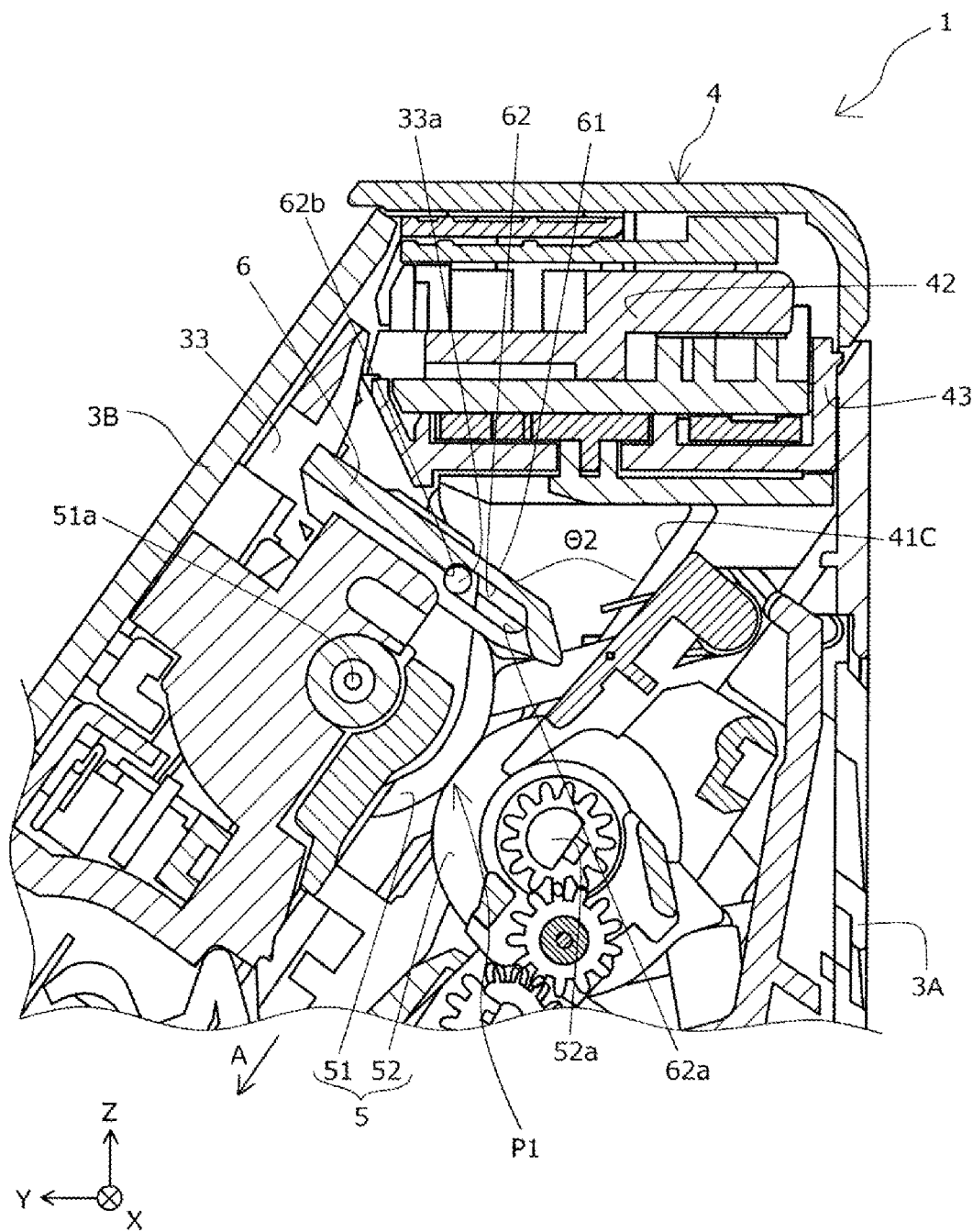
FIG. 7 is a side cross-sectional view illustrating the vicinity of a guide member of the image reading apparatus in FIG. 1 and illustrating a state where the medium placement portion is located at an accommodation position.
Figure 8:
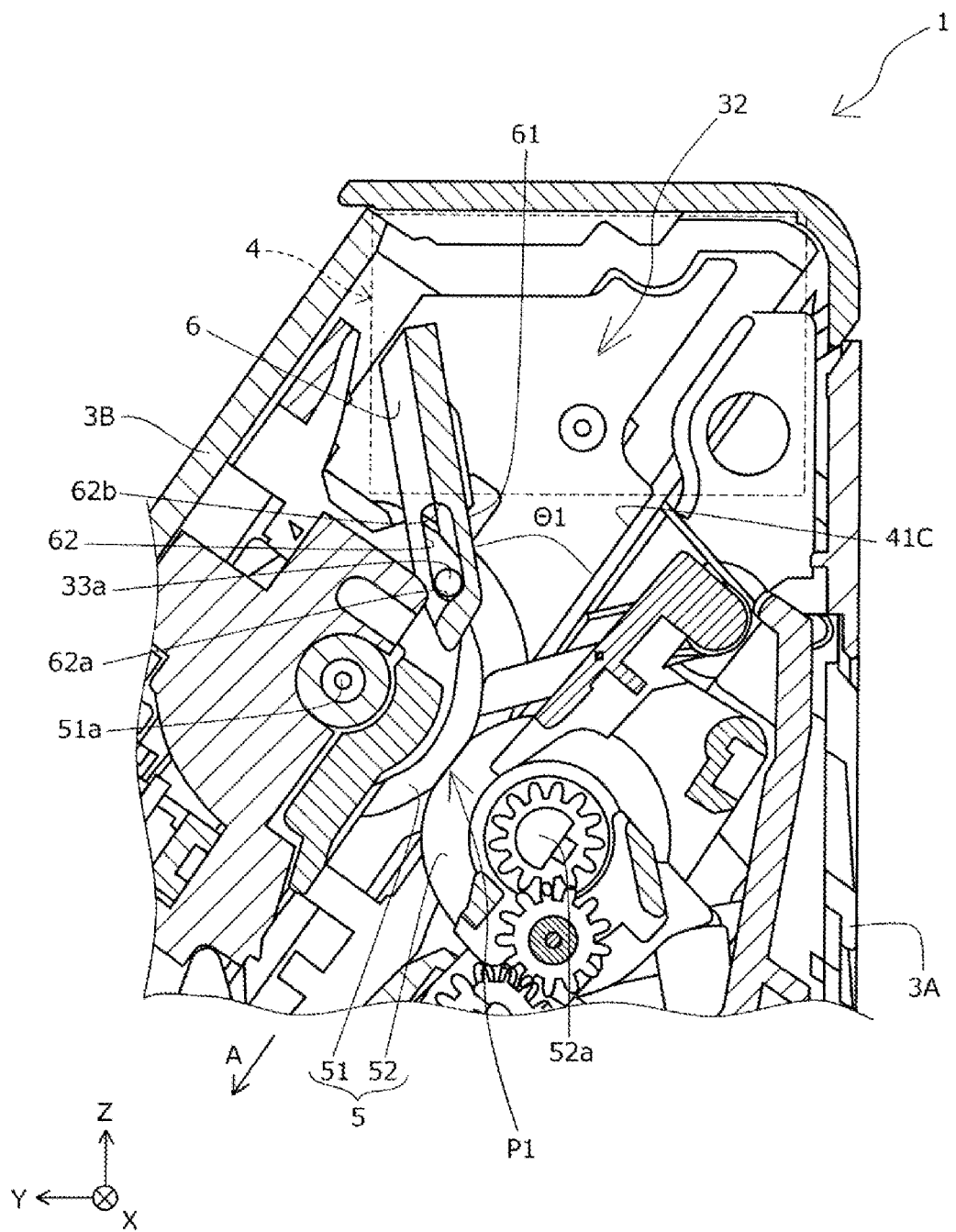
FIG. 8 is a side cross-sectional view illustrating the vicinity of the guide member of the image reading apparatus in FIG. 1 and illustrating a state where the medium placement portion is removed.

Note that a guide member 6 that guides a document when the document is set on the medium placement portion 4 is provided at a position that is upstream of the nip position between the feeding roller 51 and the separation roller 52 in the feeding direction A and faces the placement surface 41. The guide member 6 will be described below in detail. Here, the placement surface 41 includes a surface 41C in a portion of the first unit 3A of the main body portion 3 as illustrated in FIGS. 7 and 8, in addition to the surface 41A of the accommodation portion 43 and the surface 41B of the placement assisting portion 42 in the medium placement portion 4. In addition, although FIG. 8 illustrates a state where the medium placement portion 4 is removed in order to make the internal structure easy to see, the posture of the guide member 6 in a state where the medium placement portion 4 is removed corresponds to the posture of the guide member 6 in a state where the medium placement portion 4 is located at the opening position.

As illustrated in FIGS. 5, 6, and the like, a transport roller pair 7 that transports a document fed by the feeding unit 5 to the reading unit 2 is provided downstream of the feeding unit 5 in the feeding direction A. The transport roller pair 7 includes a driving roller 71 and a driving roller 72. The document fed to the transport roller pair 7 by the feeding unit 5 is nipped by the driving roller 71 and the driving roller 72 and is transported to the reading unit 2 by the rotation of the driving roller 71. However, instead of the driving roller 71, a driven roller that is provided at a position facing the driving roller 72 and is driven to rotate along with the rotation of the driving roller 72 may be provided.

As illustrated in FIGS. 5, 6, and the like, the reading unit 2 includes a first reading unit 2A that reads an image on one surface of a document and a second reading unit 2B that reads an image on the other surface of the document. In addition, a transport roller pair 8 is provided downstream of the reading unit 2 in the feeding direction A. The transport roller pair 8 includes a driving roller 81 and a driving roller 82. However, instead of the driving roller 81, a driven roller that is provided at a position facing the driving roller 82 and is driven to rotate along with the rotation of the driving roller 82 may be provided. The document transported to the transport roller pair 8 by the transport roller pair 7 is nipped by the driving roller 81 and the driving roller 82, and is transported to a plurality of discharge roller pairs 91 provided in a discharge portion 9 by rotation of the driving roller 81. Then, the document is discharged from a discharge port 92 by the discharge roller pair 91 and placed on a discharged-medium placement portion 93 provided on the surface of the second unit 3B. In FIGS. 5 and 6, a transport path of the document is indicated by an alternating dotted-dashed line. Note that, in this specification, the term "transport" is used to include feeding and discharging.

Figure 9:
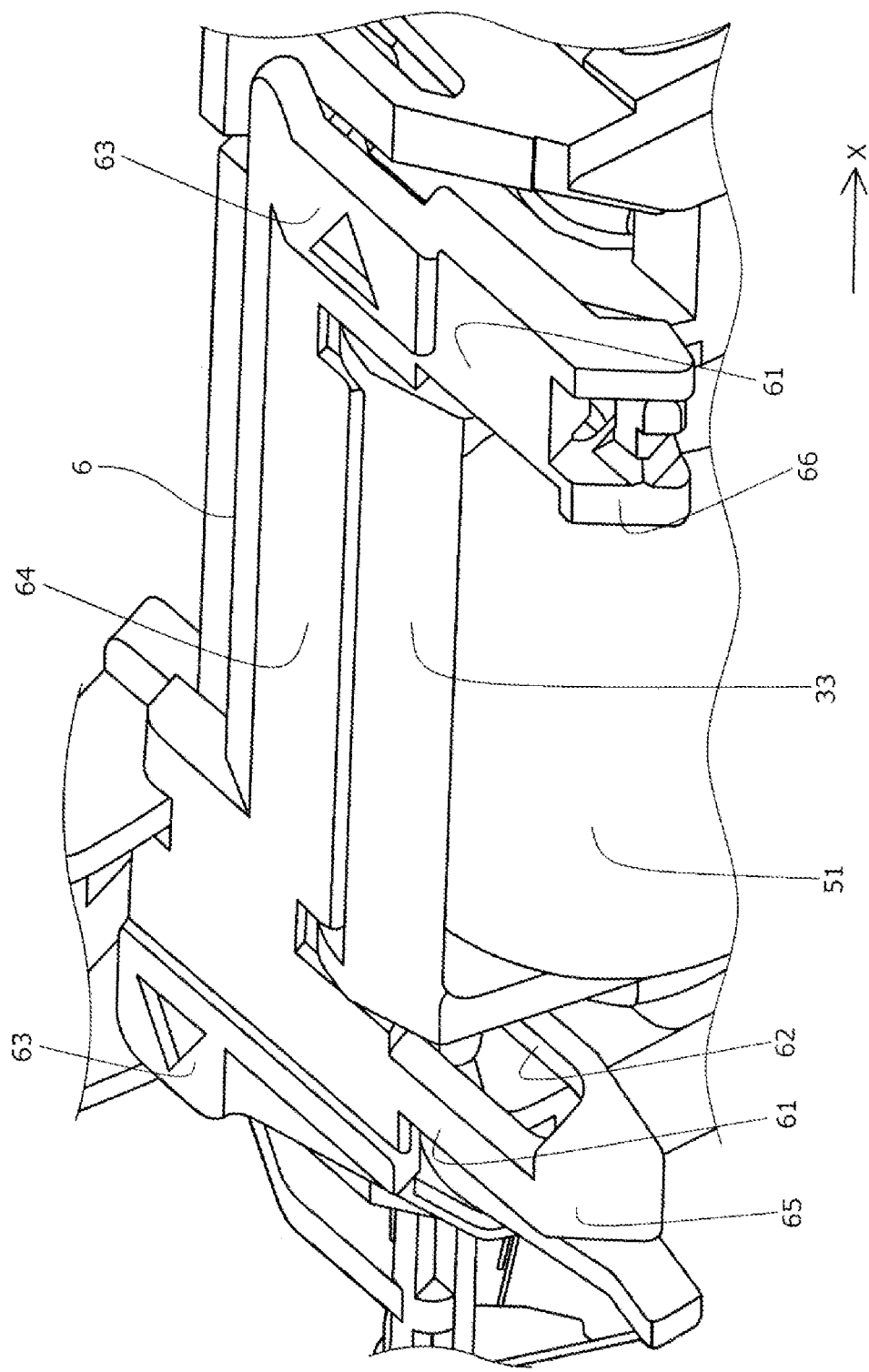
FIG. 9 is a perspective view illustrating the vicinity of an abutting portion of the guide member of the image reading apparatus in FIG. 1.

Next, the guide member 6 which is a main part of the scanner 1 according to this example will be described in detail. As described above, the guide member 6 is provided at a position facing the placement surface 41. In addition, as illustrated in FIGS. 7 to 9 and the like, the guide member 6 has a contact surface 61 which is a portion coming into contact with a document, and is configured to be able to guide the document by bringing the document into contact with the contact surface 61. In this manner, the scanner 1 according to this example includes the guide member 6 that is provided at a position facing the placement surface 41 and guides the document by bringing the document into contact with the contact surface 61. For this reason, it is possible to improve a setting property at the time of inserting the document from the insertion port 32.

Here, the guide member 6 is configured to be displaceable when the medium placement portion 4 is located at the opening position and when the medium placement portion 4 is located at the accommodation position. In detail, the guide member 6 can be displaced between a first position illustrated in FIG. 8 where the contact surface 61 forms a first inclination angle θ1 with respect to the placement surface 41 so as to form an acute angle that narrows in the feeding direction A when viewed in a width direction intersecting the feeding direction A and a second position illustrated in FIG. 7 where the contact surface 61 forms a second inclination angle θ2 with respect to the placement surface 41, the second inclination angle being larger than the first inclination angle when viewed in the width direction. In addition, the guide member 6 moves from the first position illustrated in FIG. 8 to the second position illustrated in FIG. 7 as the medium placement portion 4 moves from the opening position to the accommodation position, and moves from the second position illustrated in FIG. 7 to the first position illustrated in FIG. 8 as the medium placement portion 4 moves from the accommodation position to the opening position. That is, the guide member 6 is disposed at the first position at which a setting property at the time of inserting a document from the insertion port 32 can be improved in accordance with the movement of the medium placement portion 4 from the accommodation position to the opening position at the time of setting the document. In this manner, in the scanner 1 according to this example, the guide member 6 is displaced in association with the displacement of the medium placement portion 4, and thus it is possible to reduce a user's burden and to particularly improve a setting property of a document.

Further, in the guide member 6, at least a portion of the contact surface 61 is located upstream of the feeding unit 5 in the feeding direction A at the first position illustrated in FIG. 8, and is located downstream of the medium placement portion 4 in the feeding direction A at the second position illustrated in FIG. 7. In addition, as illustrated in FIG. 8, at least a portion of the guide member located at the first position when viewed in the width direction overlaps at least a portion of the medium placement portion 4 when the guide member is assumed to be located at the accommodation position indicated by a dashed line in FIG. 8. Since the scanner 1 according to this example has such a configuration, it is possible to bring the guide member 6 and the medium placement portion 4 close to each other and suppress an increase in the size of the apparatus.

Here, a specific structure capable of displacing the guide member 6 is described. As illustrated in FIGS. 7 and 8, FIGS. 11 and 12, and the like, the scanner 1 according to this example includes an opening/closing member 33 which is a constituent member constituting the main body portion 3 and will be described below in detail. As illustrated in FIGS. 7 and 8, the opening/closing member 33 is provided with a rotation shaft 33a, and the guide member 6 can be displaced between the first position and the second position by rotating about the rotation shaft 33a. By adopting a configuration in which the guide member 6 is displaced by being rotated in this manner, it is possible to effectively utilize the space inside the apparatus in a direction intersecting the rotation shaft 33a and to effectively suppress an increase in the size of the apparatus.

Figure 13:
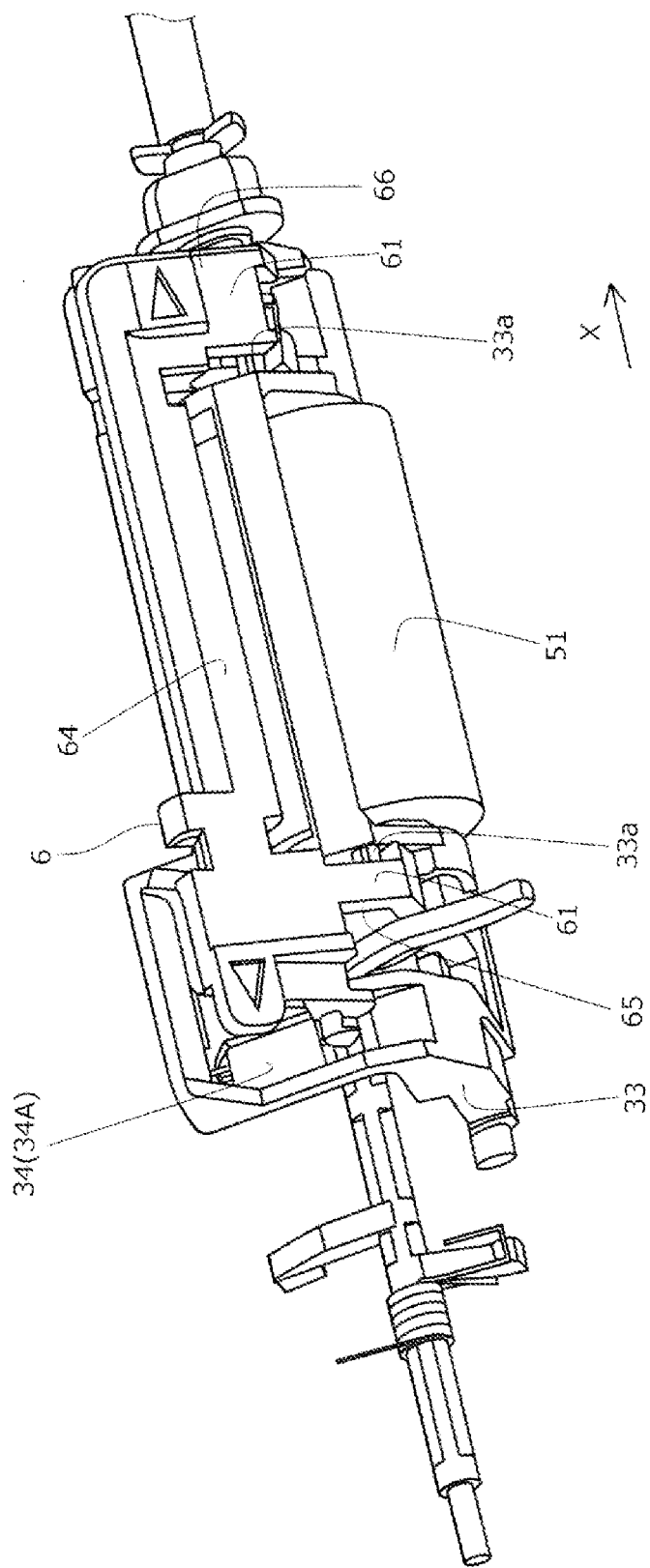
FIG. 13 is a perspective view illustrating a state where a first elastic member is attached to the guide member of the image reading apparatus in FIG. 1.
Figure 15:
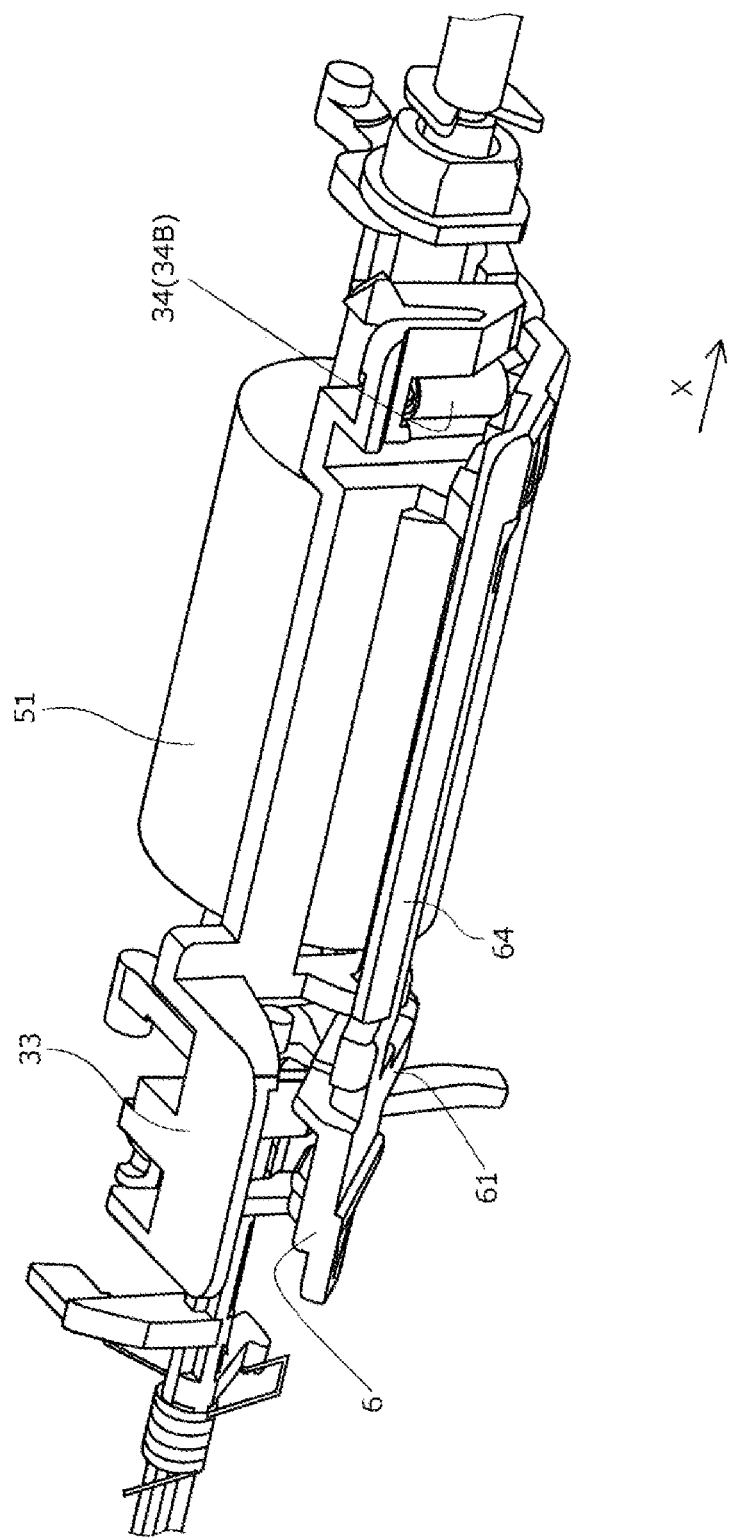
FIG. 15 is a perspective view illustrating a state where a second elastic member is attached to the guide member of the image reading apparatus in FIG. 1.

Note that, as illustrated in FIGS. 13 and 15, the scanner 1 according to this example includes an elastic member 34 that applies a force to the guide member 6. The elastic member 34 applies a force to the guide member 6 in a direction in which the guide member 6 moves from the second position to the first position. In addition, the guide member 6 moves from the second position to the first position when the elastic member 34 applies a force to the guide member 6 so that the guide member 6 moves from the second position to the first position in accordance with the movement of the medium placement portion 4 from the accommodation position to the opening position. In the scanner 1 according to this example, since the guide member 6 is moved by the elastic member 34 applying a force to the guide member 6 in accordance with the movement of the medium placement portion 4, it is possible to suitably move the guide member 6 by the elastic member 34 in association with the movement of the medium placement portion 4.

In addition, as illustrated in FIGS. 7 to 9 and the like, the guide member 6 includes a rail portion 62 extending in an extension direction along the contact surface 61. Further, the guide member 6 is movable to the main body portion 3 along the rail portion 62 by engagement between the rail portion 62 and the rotation shaft 33a, the guide member 6 engages with the rotation shaft 33a at one end 62a of the rail portion 62 in the extension direction when the guide member 6 is located at the first position as illustrated in FIG. 8, and the guide member 6 engages with the rotation shaft 33a at the other end 62b of the rail portion 62 in the extension direction when the guide member 6 is located at the second position as illustrated in FIG. 7. With such a configuration, the guide member 6 can be greatly moved in association with the movement of the medium placement portion 4, and it is possible to effectively suppress an increase in the size of the apparatus. In addition, since the contact surface 61 can be made wide, a setting property of a document can be particularly improved.

Figure 10:
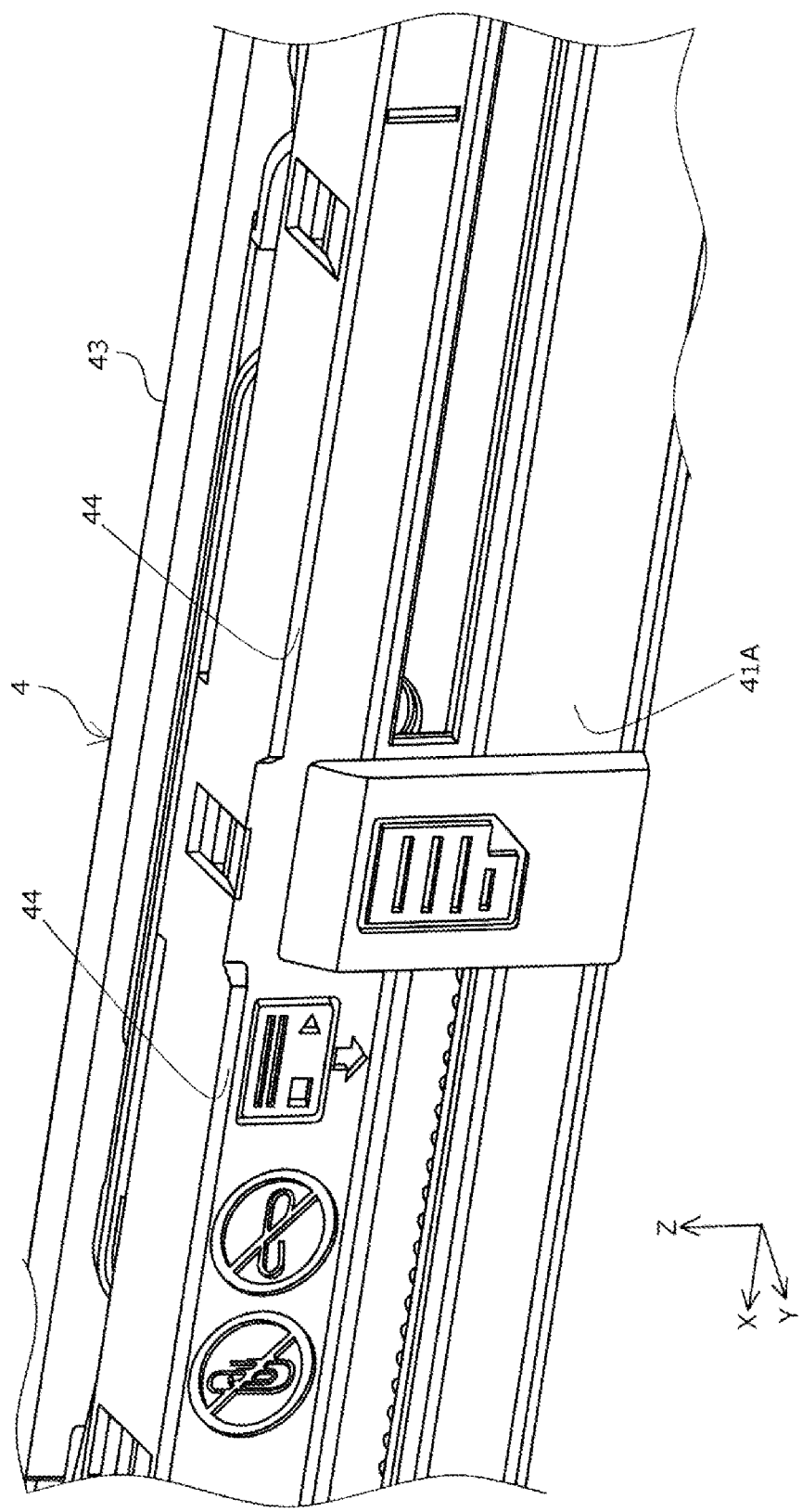
FIG. 10 is a perspective view illustrating the vicinity of an abutted portion of the medium placement portion of the image reading apparatus in FIG. 1.

Further, the scanner 1 according to this example includes a sliding surface 63 in the guide member 6 as illustrated in FIG. 9 and includes a sliding surface 44 that comes into contact with the sliding surface 63 in the medium placement portion 4 as illustrated in FIG. 10. As the medium placement portion 4 moves from the opening position to the accommodation position, the guide member 6 moves from the first position to the second position by the sliding surface 44, which is an abutting portion provided on the medium placement portion 4, coming into contact with the sliding surface 63 which is an abutted portion provided on the guide member 6. With such a configuration, it is possible to easily form a configuration in which the movement of the guide member 6 is associated with the movement of the medium placement portion 4.

In addition, the scanner 1 according to this example includes the opening/closing member 33 in the second unit 3B. Although the opening/closing member 33 is located at a closed position where the opening/closing member 33 is closed for the second unit 3B as illustrated in FIG. 11 and the like, the opening/closing member 33 is configured to be openable to an open position as illustrated in FIG. 12 when the feeding roller 51 which is a constituent member of the feeding unit 5 is attached and detached. In addition, as illustrated in FIG. 8, the guide member 6 is attached to the opening/closing member 33 so that the contact surface 61 is located upstream of the opening/closing member 33 in the feeding direction A when the guide member 6 is located at the first position. For this reason, in the scanner 1 according to this example, the guide member 6 can guide a document upstream of the opening/closing member 33 in the feeding direction A, and it is possible to prevent the accuracy of guidance of the guide member 6 from being lowered due to the opening/closing member 33.

Further, in the scanner 1 according to this example, as illustrated in FIG. 7 and the like, the guide member 6 is disposed at a position between the medium placement portion 4 and the opening/closing member 33 in the feeding direction A when the guide member 6 is located at the second position. For this reason, in the scanner 1 according to this example, the guide member 6 is disposed using a space between the medium placement portion 4 and the opening/closing member 33, and an increase in the size of the apparatus is effectively suppressed.

As described above, the scanner 1 according to this example includes the main body portion 3 including the first unit 3A and the second unit 3B provided with the opening/closing member 33 and capable of being opened and closed with respect to the first unit 3A. In addition, the guide member 6 includes a handhold portion 64 as illustrated in FIGS. 11 to 16 and the like. Here, the guide member 6 can be opened with respect to the second unit 3B as illustrated in FIG. 12 when a force is applied to the handhold portion 64 in a direction D2 with respect to the second unit 3B in a state where the second unit 3B is opened with respect to the first unit 3A as illustrated in FIG. 11, the direction D2 being a direction opposite to a direction D1 in which the second unit 3B is opened with respect to the first unit 3A. With such a configuration, a user can easily open the opening/closing member 33 by holding the handhold portion 64 with his or her hand, and it is possible to reduce the user's burden at the time of attaching and detaching the feeding roller 51.

Figure 14:
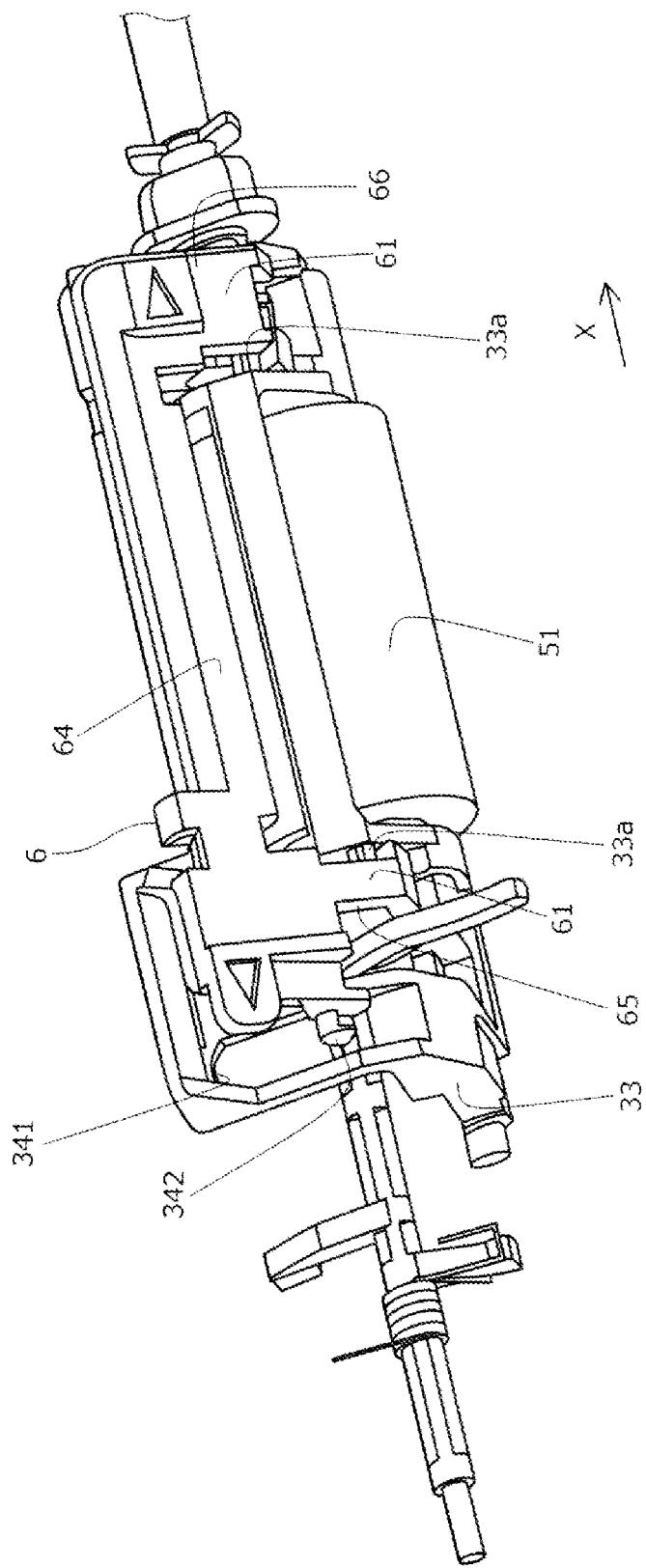
FIG. 14 is a perspective view illustrating a state where the first elastic member is removed from the state illustrated in FIG. 13.
Figure 16:
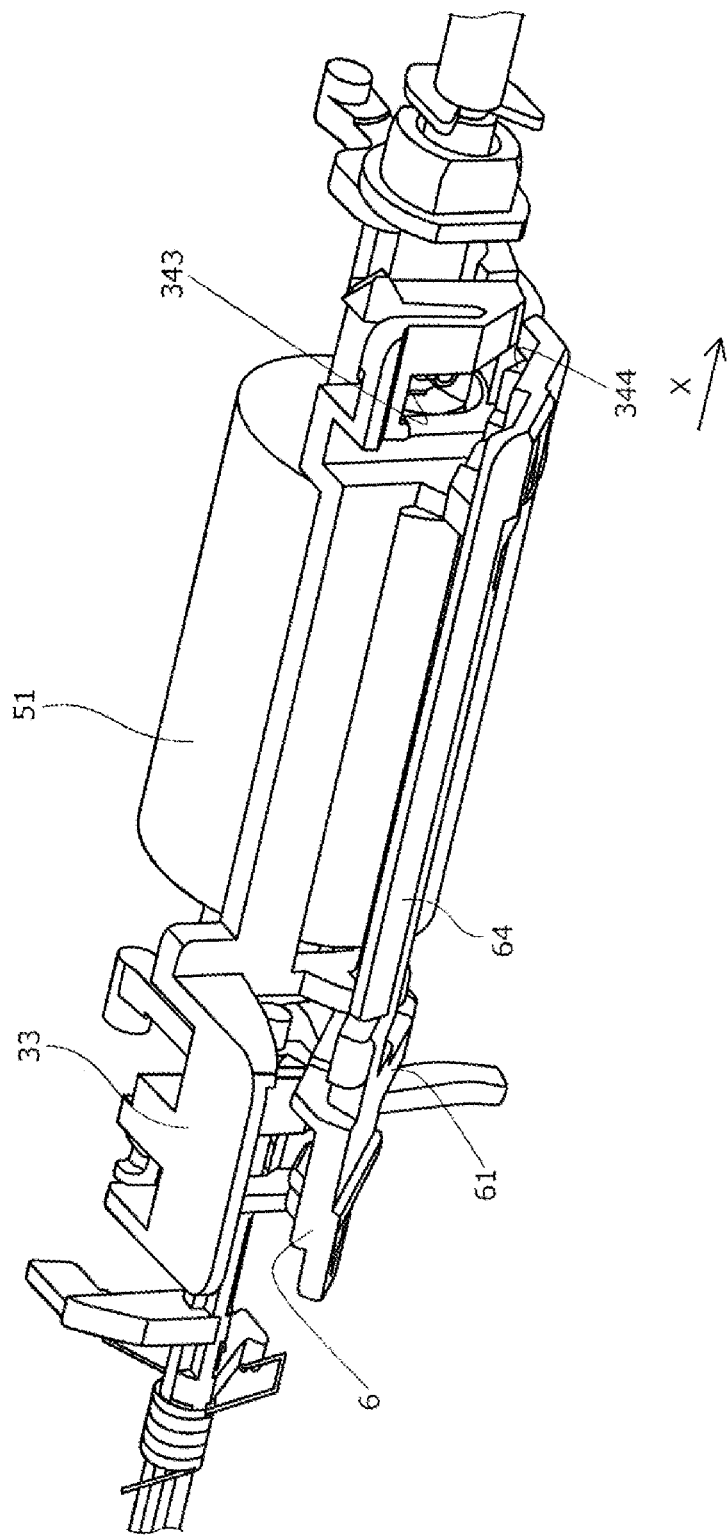
FIG. 16 is a perspective view illustrating a state where the second elastic member is removed from the state illustrated in FIG. 15.

As described above, the scanner 1 according to this example includes the elastic member 34 that applies a force to the guide member 6. Here, the scanner 1 according to this example includes a first elastic member 34A illustrated in FIG. 13 and a second elastic member 34B illustrated in FIG. 15 as the elastic member 34. The first elastic member 34A and the second elastic member 34B are both tension springs. In addition, as illustrated in FIG. 14, the first elastic member 34A is attached to a first attachment portion 341 provided in the opening/closing member 33 and a second attachment portion 342 provided in the guide member 6. In addition, as illustrated in FIG. 16, the second elastic member 34B is attached to a third attachment portion 343 provided in the opening/closing member 33 and a fourth attachment portion 344 provided in the guide member 6. Further, at least a portion of the feeding unit 5 such as the feeding roller 51 is disposed at a position between the first elastic member 34A and the second elastic member 34B in the width direction. With such a configuration, the elastic members 34 can be disposed on both sides of the feeding unit 5 in the width direction, and a balance of forces applied to the opening/closing member 33 and the guide member 6 through the elastic members 34 can be improved. However, the present disclosure is not limited to such a configuration, and for example, the opening/closing member 33 and the guide member 6 may have high rigidity, and the elastic member 34 may be disposed only on one side of the feeding unit 5 in the width direction.

As described above, the scanner 1 according to this example includes, as the feeding unit 5, the feeding roller 51 and the separation roller 52 as a separation portion which is provided at a position facing the feeding roller 51 and is capable of separating one document by nipping the document together with the feeding roller 51 when a plurality of documents are placed on the medium placing unit 4. Here, as illustrated in FIGS. 7 and 8 and the like, the guide member 6 is located upstream of a nip position P1 between the feeding roller 51 and the separation roller 52 in the feeding direction A. With such a configuration, the guide member 6 can suitably guide a document to the nip position P1, and a setting property of the document can be particularly improved.

Here, a positional relationship between the guide member 6 and the separation portions such as the feeding roller 51 and the separation roller 52 is described from another point of view. As illustrated in FIGS. 7 and 8 and the like, in this example, the rotation shaft 33a of the guide member 6 is located at a position between a rotation shaft 51a of the feeding roller 51 and a rotation shaft 52a of the separation roller 52 in the Y-axis direction corresponding to the front-back direction of the apparatus. With such a configuration, an increase in the size of the apparatus in the Y-axis direction can be suppressed. Note that, although a separation portion is the separation roller 52 in this example, the configuration of the separation portion is not particularly limited, and a configuration other than a roller, for example, a pad-like portion such as a separation pad may be used.

In addition, as illustrated in FIG. 9 and the like, in the scanner 1 according to this example, the guide member 6 includes a first arm portion 65 and a second arm portion 66 respectively having the contact surfaces 61, and the feeding roller 51 is disposed at a position between the first arm portion 65 and the second arm portion 66 in the width direction. With such a configuration, the contact surfaces 61 of the first arm portion 65 and the second arm portion 66 can be widened without increasing the size of the apparatus, and a setting property of a document can be particularly improved.

In the scanner 1 according to this example, when the medium placement portion 4 is located at the accommodation position as illustrated in FIG. 7, the medium placement portion 4 overlaps at least a portion of the feeding roller 51 and at least a portion of the separation roller 52 in the vertical direction when viewed in the width direction as illustrated in FIG. 7. For this reason, in the scanner 1 according to this example, it is possible to bring the medium placement portion 4, the feeding roller 51, and the separation roller 52 close to each other and to suppress an increase in the size of the apparatus.

As described above, in the scanner 1 according to this example, the medium placement portion 4 includes the placement assisting portion 42. Here, the placement assisting portion 42 is configured to be capable of being accommodated and extended in a state where the medium placement portion 4 is located at the opening position. With such a configuration, it is possible to use a large-sized document while suppressing an increase in the size of the apparatus.

Example 2

Hereinafter, a scanner according to Example 2 will be described with reference to FIGS. 17 and 18. The scanner according to this example is the same as the scanner 1 according to Example 1 except for the configuration described below. In detail, the scanner according to this example is different from the scanner 1 according to Example 1 only in the configuration of the guide member 6. For this reason, the scanner according to this example has features similar to those of the scanner according to Example 1 except for the matters described below. Consequently, in FIGS. 17 and 18, components in common with those in Example 1 described above are denoted by the same reference numerals and signs, and detailed description thereof is omitted.

As illustrated in FIGS. 7 and 8 and the like, in the scanner 1 according to Example 1, the rail portion 62 provided in the guide member 6 has a linear shape. On the other hand, in the scanner according to this example, the rail portion 62 provided in the guide member 6 includes a bent portion 62c as illustrated in FIGS. 17 and 18. For this reason, as illustrated in FIG. 18, the guide member 6 can be moved toward the placement surface 41 more than the guide member 6 of the scanner 1 according to Example 1. With such a configuration, the guide member 6 can also serve as a pressing member for pressing a document against the placement surface 41 at the time of transporting the document. The guide member 6 functions as a pressing member for pressing the document against the placement surface 41, and thus it is possible to press, for example, a warped document and to suppress skew of the document.

Example 3

Figure 19:
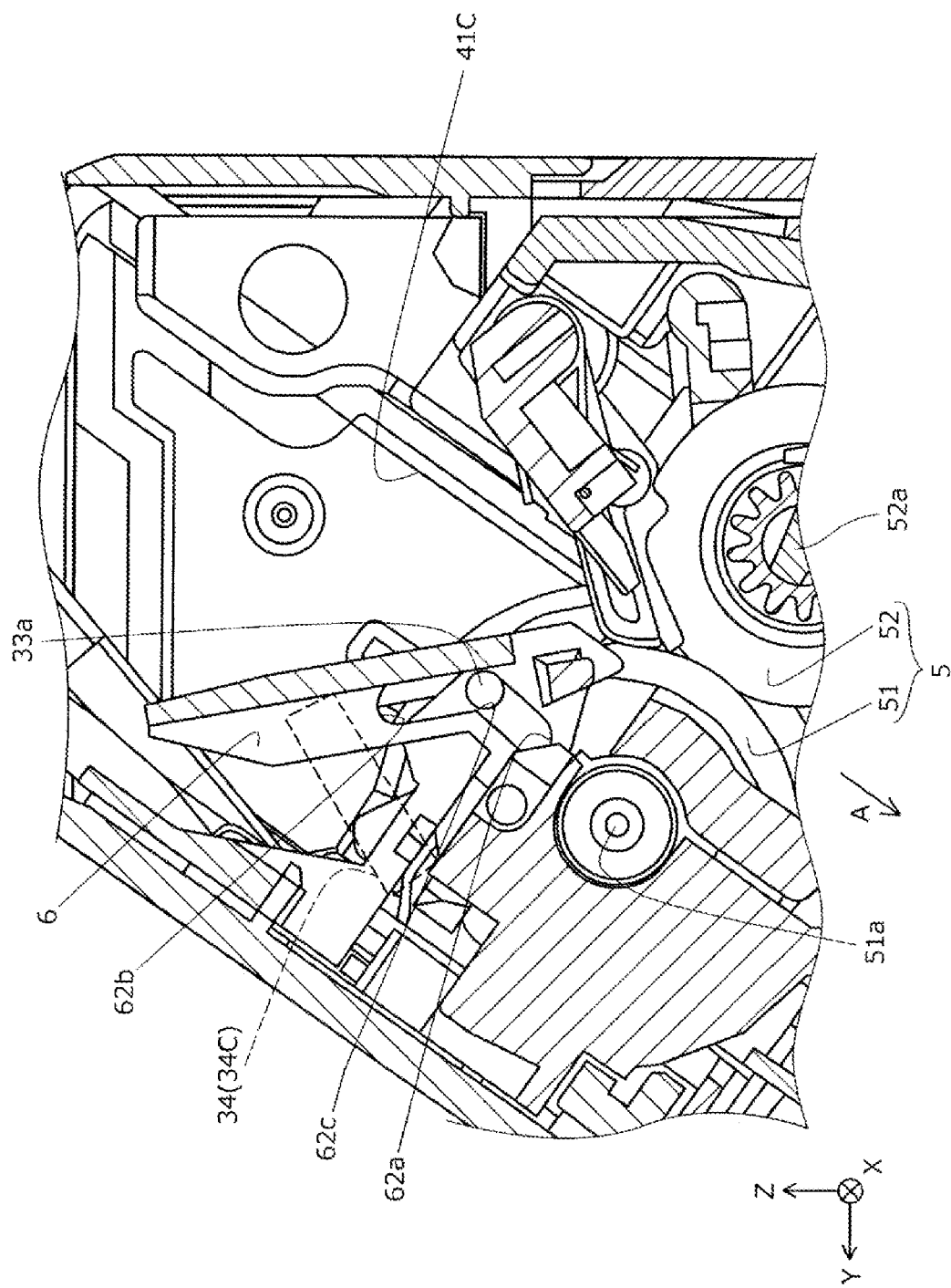
FIG. 19 is a side cross-sectional view illustrating the vicinity of a guide member of an image reading apparatus according to Example 3 of the present disclosure and illustrating a state where the guide member is located at an opening position.

A scanner according to Example 3 will be described below with reference to FIG. 19. The scanner according to this example is the same as the scanners according to Examples 1 and 2 except for the configuration described below. In detail, the scanner according to Example 2 is the same as the scanner 1 according to Example 1 in the configuration and arrangement of the elastic member 34, but the scanner according to this example is different from the scanner according to Example 2 only in the configuration and arrangement of the elastic member 34. For this reason, the scanner according to this example has features similar to those of the scanners according to Examples 1 and 2 except for the matters described below. Consequently, in FIG. 19, components in common with those in Examples 1 and 2 described above are denoted by the same reference numerals and signs, and detailed description thereof is omitted.

Figure 17:
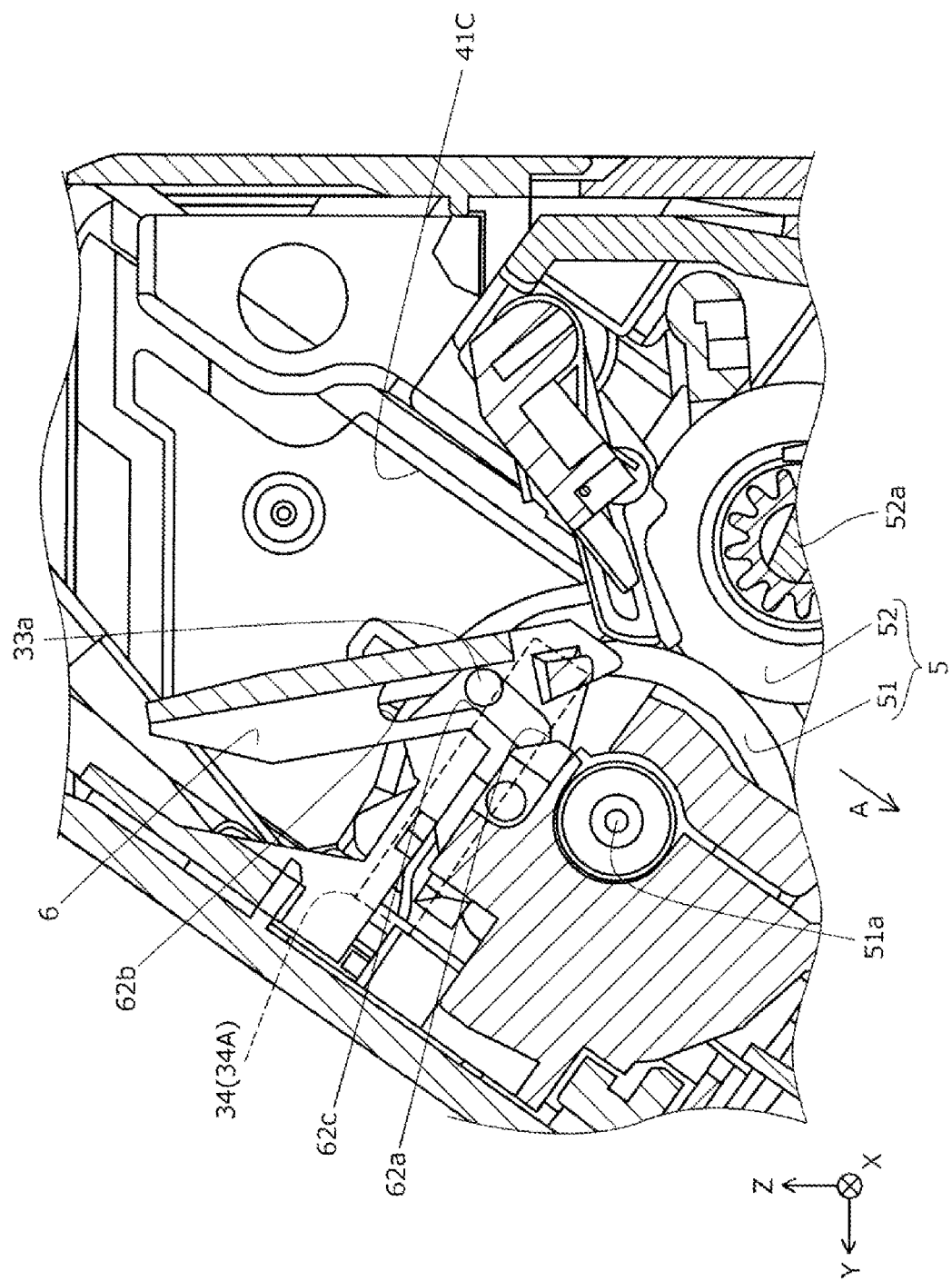
FIG. 17 is a side cross-sectional view illustrating the vicinity of a guide member at an opening position of an image reading apparatus according to Example 2 of the present disclosure and illustrating a state where the guide member is located at a position at the time of setting a medium at the opening position.
Figure 18:
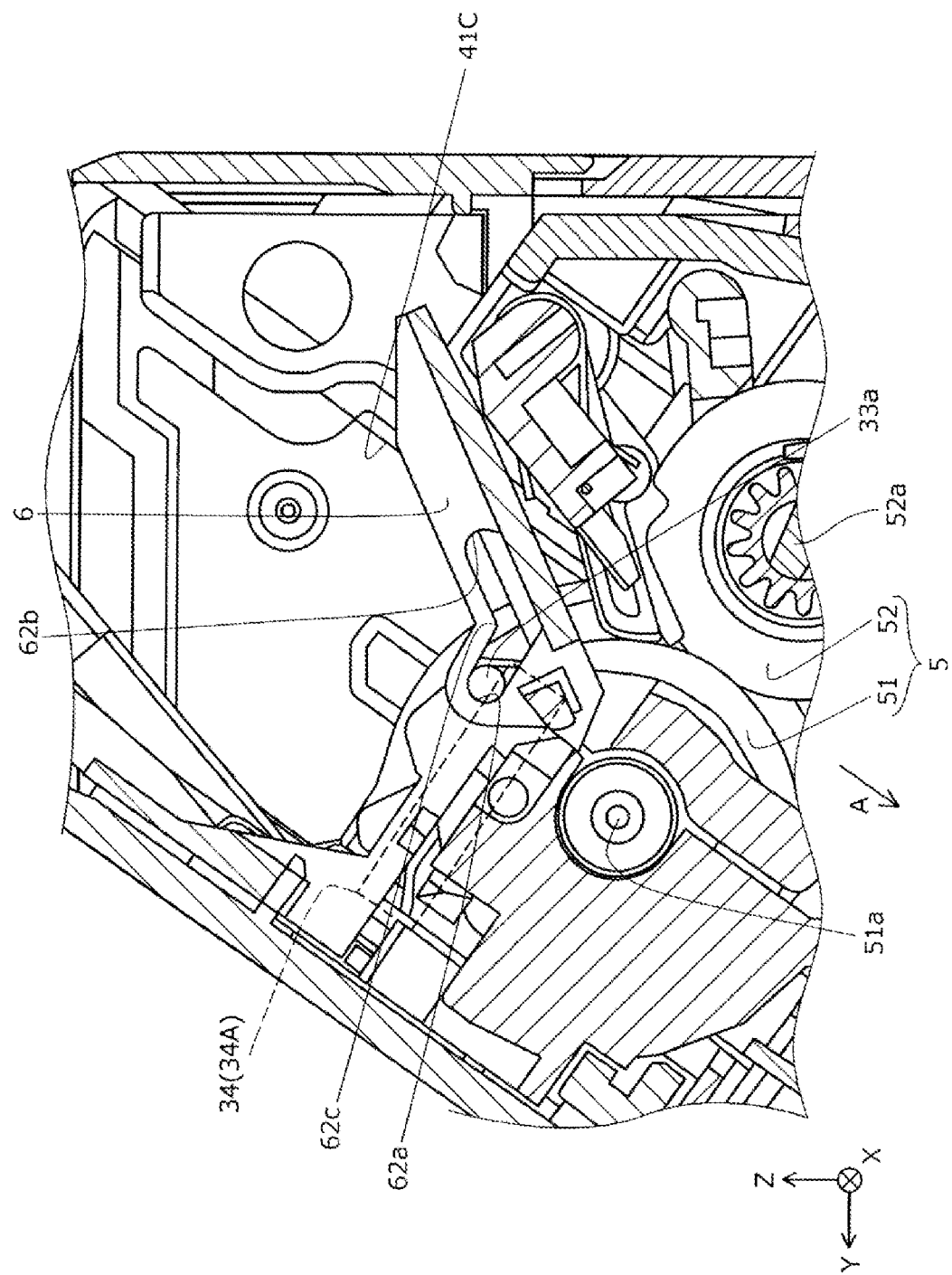
FIG. 18 is a side cross-sectional view illustrating the vicinity of the guide member located at the opening position of the image reading apparatus in FIG. 17 and illustrating a state where the guide member is located at a position at the time of medium feeding at the opening position.

In the scanner according to Example 2, the elastic member 34 is a tension spring and is disposed as illustrated in FIGS. 17 and 18. On the other hand, in the scanner according to this example, the elastic member 34 is a pressing spring 34C that applies a pressing force toward the outside and is disposed as illustrated in FIG. 18. In this manner, members having various configurations can be used as the elastic member 34, and the elastic member 34 can be appropriately disposed in accordance with the structure thereof.

The present disclosure is not intended to be limited to the above-described embodiment, and many variations are possible within the scope of the present disclosure as described in the appended claims. It goes without saying that such variations also fall within the scope of the present disclosure.

The above-described embodiment can also be applied to a medium feeding device that does not include a reading unit. In the above-described embodiment, the example in which the present disclosure is applied to an image reading apparatus represented by a scanner has been described, but the present disclosure can also be applied to a recording apparatus represented by a printer. That is, the same effects as those of the above-described embodiment can be obtained in the recording apparatus using the document as a recording medium and using the reading unit as a recording unit that performs recording on the recording medium in the above-described embodiment. An example of the recording apparatus may be an ink jet printer, and an example of the recording unit may be an ink jet recording head.

What is claimed is:

1. An image reading apparatus comprising:
    an insertion port for a medium;
    a medium placement portion that is displaceable between an opening position at which the insertion port is open and an accommodation position at which the insertion port is closed by at least a portion of the medium placement portion being accommodated in the insertion port, the medium placement portion being configured such that the medium inserted from the insertion port is placed on a placement surface when the medium placement portion is located at the opening position;
    a feeding unit that feeds the medium placed on the placement surface in a feeding direction;
    a reading unit that reads an image of the medium fed by the feeding unit; and
    a guide member that is provided at a position facing the placement surface and guides the medium by bringing the medium into contact with a contact surface, wherein
    the guide member is displaceable between a first position and a second position, the first position being a position where the contact surface forms a first inclination angle with respect to the placement surface so as to form an acute angle that narrows in the feeding direction when viewed in a width direction intersecting the feeding direction, the second position being a position where the contact surface forms a second inclination angle with respect to the placement surface, and the second inclination angle being larger than the first inclination angle when viewed in the width direction, and
    the guide member moves from the first position to the second position as the medium placement portion moves from the opening position to the accommodation position, and moves from the second position to the first position as the medium placement portion moves from the accommodation position to the opening position.

2. The image reading apparatus according to claim 1, wherein
    at least a portion of the contact surface of the guide member is located upstream of the feeding unit in the feeding direction at the first position and is located downstream of the medium placement portion in the feeding direction at the second position, and
    at least a portion of the guide member located at the first position overlaps at least a portion of the medium placement portion assumed to be located at the accommodation position when viewed in the width direction.

3. The image reading apparatus according to claim 1, further comprising:
    a main body portion that is provided with a rotation shaft, wherein
    the guide member is displaceable between the first position and the second position by being rotated about the rotation shaft, and
    the image reading apparatus further comprises an elastic member that applies a force to the guide member.

4. The image reading apparatus according to claim 3, wherein
    the guide member moves from the second position to the first position when the elastic member applies the force to the guide member so that the guide member moves from the second position to the first position as the medium placement portion moves from the accommodation position to the opening position.

5. The image reading apparatus according to claim 3, wherein
    the guide member includes a rail portion extending in an extension direction along the contact surface, and is movable along the rail portion with respect to the main body portion by the rail portion engaging with the rotation shaft, and
    the guide member engages with the rotation shaft at one end of the rail portion in the extension direction when the guide member is located at the first position, and engages with the rotation shaft at the other end of the rail portion in the extension direction when the guide member is located at the second position.

6. The image reading apparatus according to claim 1, wherein
    the guide member moves from the first position to the second position when an abutting portion provided in the medium placement portion comes into contact with an abutted portion provided in the guide member as the medium placement portion moves from the opening position to the accommodation position.

7. The image reading apparatus according to claim 1, further comprising:
    an opening/closing member that is openable when the feeding unit is attached and detached, wherein the guide member is attached to the opening/closing member so that the contact surface is located upstream of the opening/closing member in the feeding direction when the guide member is located at the first position.

8. The image reading apparatus according to claim 7, wherein
    the guide member is disposed at a position between the medium placement portion and the opening/closing member in the feeding direction when the guide member is located at the second position.

9. The image reading apparatus according to claim 7, further comprising:
    a main body portion including a first unit and a second unit provided with the opening/closing member and openable and closable with respect to the first unit, wherein
    the guide member includes a handhold portion, and the opening/closing member is opened with respect to the second unit when a force is applied to the handhold portion in a direction opposite to a direction in which the second unit is opened with respect to the first unit, in the second unit opened with respect to the first unit.

10. The image reading apparatus according to claim 7, further comprising:
an elastic member that applies a force to the guide member, wherein
a first elastic member and a second elastic member are provided as the elastic member,
the first elastic member is attached to a first attachment portion provided in the opening/closing member and a second attachment portion provided in the guide member,
the second elastic member is attached to a third attachment portion provided in the opening/closing member and a fourth attachment portion provided in the guide member, and
at least a portion of the feeding unit is disposed at a position between the first elastic member and the second elastic member in the width direction.

11. The image reading apparatus according to claim 1, wherein
a feeding roller and a separation portion are provided as the feeding unit, the separation portion being provided at a position facing the feeding roller and being configured to, when a plurality of the media are placed on the medium placement portion, separate one medium by nipping the medium together with the feeding roller, and
the guide member is located upstream of a nip position between the feeding roller and the separation portion in the feeding direction.

12. The image reading apparatus according to claim 11, wherein
the guide member includes a first arm portion and a second arm portion having the contact surface, and
the feeding roller is disposed at a position between the first arm portion and the second arm portion in the width direction.

13. The image reading apparatus according to claim 11, wherein
the medium placement portion overlaps at least a portion of the feeding roller and at least a portion of the separation portion in a vertical direction when viewed in the width direction when the medium placement portion is located at the accommodation position.

14. The image reading apparatus according to claim 1, wherein
the medium placement portion includes a placement assisting portion configured to be accommodated and extended in a state where the medium placement portion is located at the opening position.

* * * * *